United States Patent [19]

Shapiro et al.

[11] 3,875,391

[45] Apr. 1, 1975

[54] PIPELINE SIGNAL PROCESSOR

[75] Inventors: Gerald N. Shapiro, Arlington; Herbert S. Sobel, Wayland, both of Mass.

[73] Assignee: Raytheon Company, Lexington, Mass.

[22] Filed: Nov. 2, 1973

[21] Appl. No.: 412,070

[52] U.S. Cl. .............................. 235/156, 340/172.5

[51] Int. Cl. .......................... G06f 7/38, G06f 15/00

[58] Field of Search ........... 235/156, 159, 160, 164, 235/168; 340/172.5

[56] References Cited

UNITED STATES PATENTS

| | | | |
|---|---|---|---|
| 3,346,851 | 10/1967 | Thornton et al. | 235/156 X |
| 3,771,138 | 11/1973 | Celtruda et al. | 340/172.5 |
| 3,771,141 | 11/1973 | Culler | 340/172.5 |
| 3,787,673 | 1/1974 | Watson et al. | 235/156 |

*Primary Examiner*—Malcolm A. Morrison
*Assistant Examiner*—David H. Malzahn
*Attorney, Agent, or Firm*—Richard M. Sharkansky; Philip J. McFarland; Joseph D. Pannone

[57] ABSTRACT

A signal processor including a programmable arithmetic controller and a pipeline arithmetic unit controlled by such controller is disclosed. The arithmetic unit includes a plurality of serially coupled processing levels. The arithmetic controller includes a corresponding plurality of serially coupled control levels, each one of such control levels being coupled to a corresponding one of the processing levels. Each one of the processing levels passes digital data applied thereto in accordance with a control instruction applied to such processing level by the arithmetic controller. As data passes through the various processing levels, the control instruction associated with such data passes through the corresponding control level so that such control instruction "follows" such data as both data and control instruction pass through the processor. In this way the processor is adapted to start a new process concurrently as such processor completes a prior process.

9 Claims, 20 Drawing Figures

PATENTED APR 1 1975

3,875,391

SHEET 01 OF 16

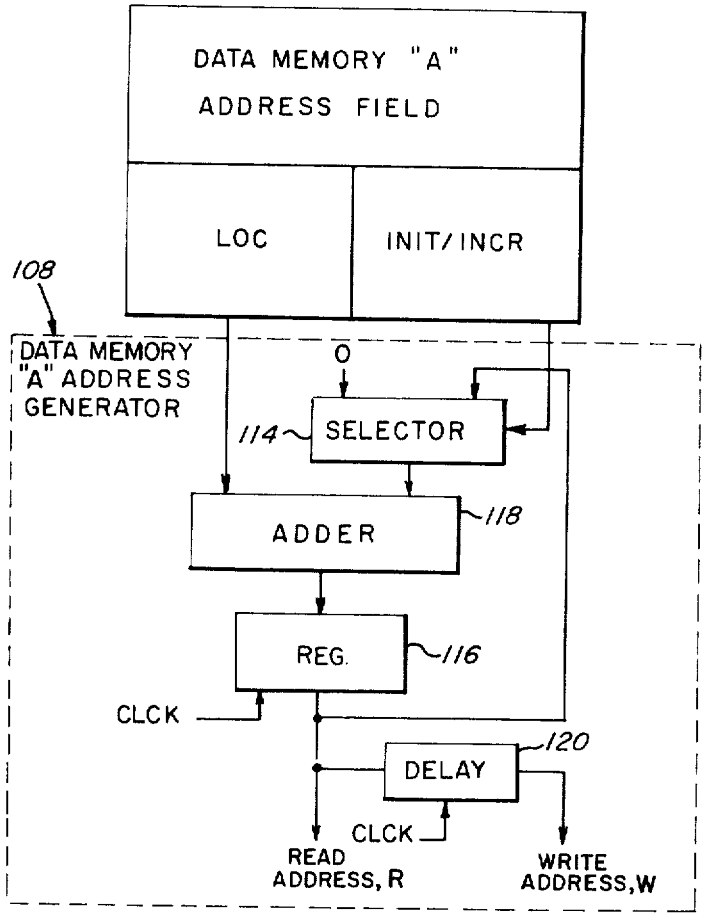
FIG. 2
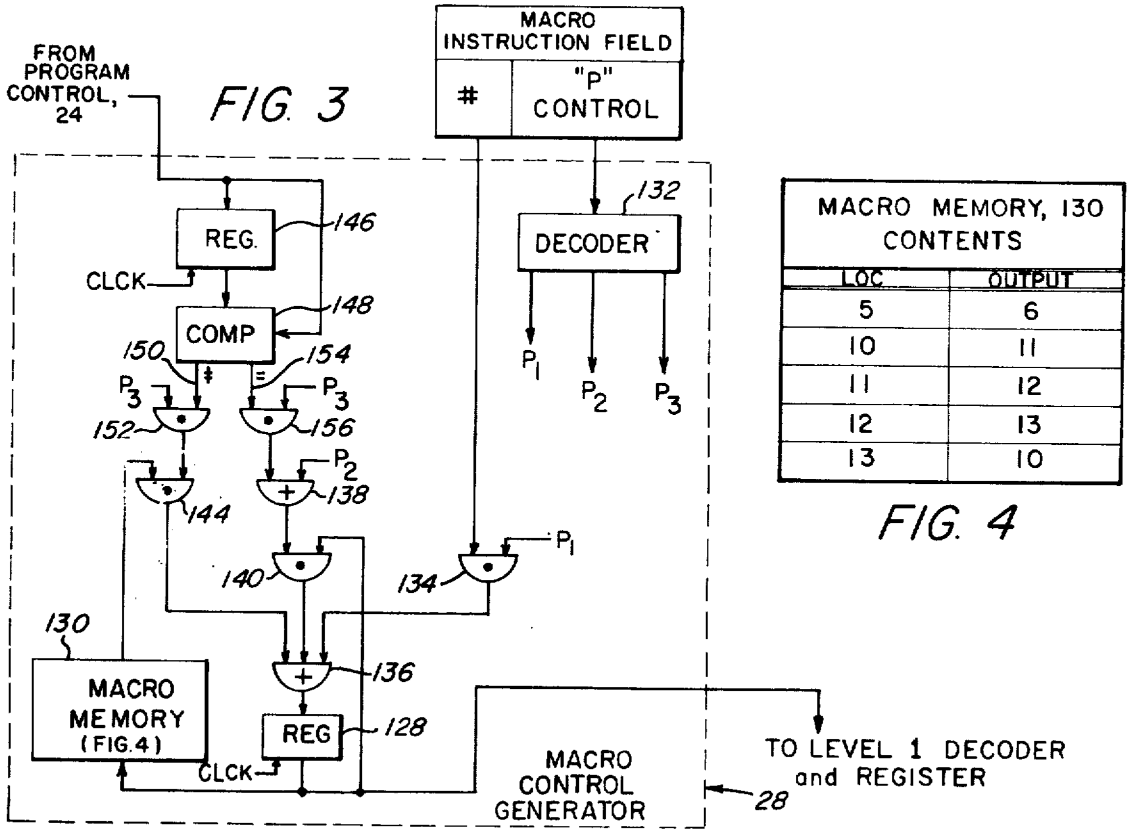
FIG. 3
| MACRO MEMORY, 130 CONTENTS | |
|---|---|
| LOC | OUTPUT |
| 5 | 6 |
| 10 | 11 |
| 11 | 12 |
| 12 | 13 |
| 13 | 10 |
FIG. 4

FIG. 8

| Phase | PROGRAM CONTROL FIELD: MEM. LOC. | PROGRAM CONTROL FIELD: NEXT ADDR. | INSTRUCTION: NUMBER OF TIMES | INSTRUCTION: CONTROL | MACRO INSTRUCTION FIELD: No. | MACRO INSTRUCTION FIELD: "P" CONTROL | DATA MEMORY "A" ADDRESS FIELD: LOC. | DATA MEMORY "A" ADDRESS FIELD: INIT/INCR. | DATA MEMORY "B" ADDRESS FIELD: LOC. | DATA MEMORY "B" ADDRESS FIELD: INIT/INCR. | COEFFICIENT MEMORY ADDRESS FIELD: LOC. | COEFFICIENT MEMORY ADDRESS FIELD: INIT/INCR. |
|---|---|---|---|---|---|---|---|---|---|---|---|---|
| PREL. PROC. PHASE | 1 | 2 | — | TRA | 1 | 1 | 1 | INIT | — | — | 1 | INIT |
| | 2 | 3 | 15 | LUP | — | 2 | 1 | INCR | — | — | 0 | INCR |
| PROCESS 1 | 3 | 4 | — | TRA | 5 | 1 | 1 | INIT | 1 | INIT | 1 | INIT |
| | 4 | 5 | 7 | LUP | — | 2 | 1 | INCR | 1 | INCR | 0 | INCR |
| | 5 | 5 | 8 | XJP | — | 3 | 1 | INCR | 1 | INCR | 0 | INCR |
| PROCESS 2 | 6 | 7 | — | TRA | 10 | 1 | 1 | INIT | 9 | INIT | 2 | INIT |
| | 7 | 8 | 3 | LUP | — | 2 | 1 | INCR | 1 | INCR | 0 | INCR |
| | 8 | 8 | 4 | XJP | — | 3 | 1 | INCR | 1 | INCR | 0 | INCR |
| | 9 | 7 | 1 | XRT | — | 3 | 1 | INCR | -15 | INCR | 1 | INCR |
| PROCESS 3 | 10 | 11 | — | TRA | 10 | 1 | 1 | INIT | 13 | INIT | 4 | INIT |
| | 11 | 12 | 1 | LUP | — | 2 | 1 | INCR | 1 | INCR | 0 | INCR |
| | 12 | 12 | 2 | XJP | — | 3 | 1 | INCR | 1 | INCR | 0 | INCR |
| | 13 | 11 | 3 | XRT | — | 3 | 1 | INCR | -7 | INCR | 1 | INCR |
| PROCESS 4 | 14 | 15 | — | TRA | 10 | 1 | 1 | INIT | 15 | INIT | 8 | INIT |
| | 15 | 15 | 1 | XJP | — | 3 | 1 | INCR | 1 | INCR | 0 | INCR |
| | 16 | 15 | 7 | XRT | — | 3 | 1 | INCR | -3 | INCR | 1 | INCR |
| PROCESS 5 | 17 | 18 | — | TRA | 10 | 1 | 1 | INIT | 16 | INIT | 16 | INIT |
| | 18 | 18 | 1 | XJP | 12 | 1 | 1 | INCR | -1 | INCR | 1 | INCR |
| | 19 | 18 | 7 | XRT | 10 | 1 | 1 | INCR | -1 | INCR | 1 | INCR |
| FINAL DATA UNLOAD | 20 | 21 | — | TRA | 1 | 1 | 1 | INIT | 16 | INIT | 1 | INIT |
| | 21 | 22 | 15 | LUP | — | 2 | 1 | INCR | -1 | INCR | 0 | INCR |

| DURING CLOCK PERIOD NO. | DATA OUT OF MEM. ADDR. REG. 158 | DATA APPLIED TO REG. 128 | DATA APPLIED TO DECODERS | | | DATA MEMORY | | | | COEFF. MEM'Y ADDR. | DATA APPLIED TO SELECTOR, 48 LEVEL 1 | | | DATA APPLIED TO SELECTOR, 74 LEVEL | | DATA APPLIED TO SELECTOR, 98 LEVEL 3 | | DATA APPLIED TO | | OUTPUT |
|---|---|---|---|---|---|---|---|---|---|---|---|---|---|---|---|---|---|---|---|---|
| | | | | | | "A" ADDR. | | B ADDR. | | | | | | | | | | DATA MEM."A" | DATA MEM."B" | |
| | | | LEV. 1 DEC'DR 30 | LEV. 2 DEC'DR 40 | LEV. 3 DEC'DR 44 | R | W | R | W | R | BUS 62 | BUS 64 | BUS 68 | BUS 86 | BUS 88 | BUS 100 | BUS 102 | BUS 106 | BUS 104 | BUS 107 |
| 1 | 1 | 1 | | | | | | | | | | | | | | | | | | |
| 2 | 2 | 1 | 1 | | | 1 | | | | 1 | $S_1$ | | | | | | | | | |
| 3 | 2 | 1 | 1 | | | 2 | | | | 1 | $S_2$ | | | | | | | | | |
| 4 | 2 | 1 | 1 | 1 | | 3 | | | | 1 | $S_3$ | | | | $S_1$ | | | | | |
| 5 | 2 | 1 | 1 | 1 | 1 | 4 | 1 | | | 1 | $S_4$ | | | | $S_2$ | $S_1$ | | $S_1$ | | * |
| 6 | 2 | 1 | 1 | 1 | 1 | 5 | 2 | | | 1 | $S_5$ | | | | $S_3$ | $S_2$ | | $S_2$ | | * |
| 7 | 2 | 1 | 1 | 1 | 1 | 6 | 3 | | | 1 | $S_6$ | | | | $S_4$ | $S_3$ | | $S_3$ | | * |
| 8 | 2 | 1 | 1 | 1 | 1 | 7 | 4 | | | 1 | $S_7$ | | | | $S_5$ | $S_4$ | | $S_4$ | | * |
| 9 | 2 | 1 | 1 | 1 | 1 | 8 | 5 | | | 1 | $S_8$ | | | | $S_6$ | $S_5$ | | $S_5$ | | * |
| 10 | 2 | 1 | 1 | 1 | 1 | 9 | 6 | | | 1 | $S_9$ | | | | $S_7$ | $S_4$ | | $S_4$ | | * |
| 11 | 2 | 1 | 1 | 1 | 1 | 10 | 7 | | | 1 | $S_{10}$ | | | | $S_8$ | $S_5$ | | $S_5$ | | * |
| 12 | 2 | 1 | 1 | 1 | 1 | 11 | 8 | | | 1 | $S_{11}$ | | | | $S_9$ | $S_6$ | | $S_6$ | | * |
| 13 | 2 | 1 | 1 | 1 | 1 | 12 | 9 | | | 1 | $S_{12}$ | | | | $S_{10}$ | $S_7$ | | $S_7$ | | * |
| 14 | 2 | 1 | 1 | 1 | 1 | 13 | 10 | | | 1 | $S_{13}$ | | | | $S_{11}$ | $S_8$ | | $S_8$ | | * |
| 15 | 2 | 1 | 1 | 1 | 1 | 14 | 11 | | | 1 | $S_{14}$ | | | | $S_{12}$ | $S_9$ | | $S_9$ | | * |
| 16 | 2 | 1 | 1 | 1 | 1 | 15 | 12 | | | 1 | $S_{15}$ | | | | $S_{13}$ | $S_{10}$ | | $S_{10}$ | | * |

FIG. 9

| DURING CLOCK PERIOD NO. | DATA OUT OF MEM. ADDR. REG. 158 | DATA APPLIED TO REG. 128 | DATA APPLIED TO DECODERS | | | DATA MEMORY | | | | COEFF. MEM'Y ADDR. | DATA APPLIED TO SELECTOR, 48 LEVEL 1 | | | DATA APPLIED TO SELECTOR, 74 LEVEL 2 | | DATA APPLIED TO SELECTOR, 98 LEVEL 3 | | DATA APPLIED TO | | OUTPUT |
|---|---|---|---|---|---|---|---|---|---|---|---|---|---|---|---|---|---|---|---|---|
| | | | | | | "A" ADDR | | "B" ADDR | | | | | | | | | | DATA MEM "A" | DATA MEM "B" | |
| | | | LEV. 1 30 | LEV. 2 40 | LEV. 3 44 | R | W | R | W | R | BUS 62 | BUS 64 | BUS 68 | BUS 86 | BUS 88 | BUS 100 | BUS 102 | BUS 106 | BUS 104 | BUS 107 |
| 17 | 3 | 5 | 1 | 1 | 1 | 16 | 13 | | | 1 | $S_{16}$ | | | | $S_{14}$ | $S_{13}$ | | | | * |
| 18 | 4 | 5 | 5 | 1 | 1 | 1 | 14 | 1 | | 1 | $S_{17}$ | $S_1$ | | | $S_{15}$ | $S_{14}$ | | | | * |
| 19 | 4 | 5 | 5 | 1 | 1 | 2 | 15 | 2 | | 1 | $S_{18}$ | $S_2$ | | | $S_{16}$ | $S_{15}$ | | | | * |
| 20 | 4 | 5 | 5 | 5 | 1 | 3 | 16 | 3 | | 1 | $S_{19}$ | $S_3$ | | $S_1$ | $S_{17}$ | $S_{16}$ | | | | * |
| 21 | 4 | 5 | 5 | 5 | 5 | 4 | 1 | 4 | 1 | 1 | $S_{20}$ | $S_4$ | | $S_2$ | $S_{18}$ | $S_1+S_{17}$ | $S_1-S_{17}$ | $S_1+S_{17}$ | $S_1-S_{17}$ | |
| 22 | 4 | 5 | 5 | 5 | 5 | 5 | 2 | 5 | 2 | 1 | $S_{21}$ | $S_5$ | | $S_3$ | $S_{19}$ | $S_2+S_{18}$ | $S_2-S_{18}$ | $S_2+S_{18}$ | $S_2-S_{18}$ | |
| 23 | 4 | 5 | 5 | 5 | 5 | 6 | 3 | 6 | 3 | 1 | $S_{22}$ | $S_6$ | | $S_4$ | $S_{20}$ | $S_3+S_{19}$ | $S_3-S_{19}$ | $S_3+S_{19}$ | $S_3-S_{19}$ | |
| 24 | 4 | 5 | 5 | 5 | 5 | 7 | 4 | 7 | 4 | 1 | $S_{23}$ | $S_7$ | | $S_5$ | $S_{21}$ | $S_4+S_{20}$ | $S_4-S_{20}$ | $S_4+S_{20}$ | $S_4-S_{20}$ | |
| 25 | 5 | 6 | 5 | 5 | 5 | 8 | 5 | 8 | 5 | 1 | $S_{24}$ | $S_8$ | | $S_6$ | $S_{22}$ | $S_5+S_{21}$ | $S_5-S_{21}$ | $S_5+S_{21}$ | $S_5-S_{21}$ | |
| 26 | 5 | 6 | 6 | 5 | 5 | 9 | 6 | 9 | 6 | 1 | $S_{25}$ | $S_9$ | | $S_7$ | $S_{23}$ | $S_6+S_{22}$ | $S_6-S_{22}$ | $S_6+S_{22}$ | $S_6-S_{22}$ | |
| 27 | 5 | 6 | 6 | 5 | 5 | 10 | 7 | 10 | 7 | 1 | $S_{26}$ | $S_{10}$ | | $S_8$ | $S_{24}$ | $S_7+S_{23}$ | $S_7-S_{23}$ | $S_7+S_{23}$ | $S_7-S_{23}$ | |
| 28 | 5 | 6 | 6 | 6 | 5 | 11 | 8 | 11 | 8 | 1 | $S_{27}$ | $S_{11}$ | | $S_9$ | $S_{25}$ | $S_8+S_{24}$ | $S_8-S_{24}$ | $S_8+S_{24}$ | $S_8-S_{24}$ | |
| 29 | 5 | 6 | 6 | 6 | 6 | 12 | 9 | 12 | 9 | 1 | $S_{28}$ | $S_{12}$ | | $S_{10}$ | $S_{26}$ | $S_9+S_{25}$ | $S_9-S_{25}$ | $S_9-S_{25}$ | $S_9+S_{25}$ | |
| 30 | 5 | 6 | 6 | 6 | 6 | 13 | 10 | 13 | 10 | 1 | $S_{29}$ | $S_{13}$ | | $S_{11}$ | $S_{27}$ | $S_{10}+S_{26}$ | $S_{10}-S_{26}$ | $S_{10}-S_{26}$ | $S_{10}+S_{26}$ | |
| 31 | 5 | 6 | 6 | 6 | 6 | 14 | 11 | 14 | 11 | 1 | $S_{30}$ | $S_{14}$ | | $S_{12}$ | $S_{28}$ | $S_{11}+S_{27}$ | $S_{11}-S_{27}$ | $S_{11}-S_{27}$ | $S_{11}+S_{27}$ | |
| 32 | 5 | 6 | 6 | 6 | 6 | 15 | 12 | 15 | 12 | 1 | $S_{31}$ | $S_{15}$ | | $S_{13}$ | $S_{29}$ | $S_{12}+S_{28}$ | $S_{12}-S_{28}$ | $S_{12}-S_{28}$ | $S_{12}+S_{28}$ | |

FIG. 10

| DURING CLOCK PERIOD NO. | DATA OUT OF MEM. ADDR. REG 158 | DATA APPLIED TO REG. 158 | DATA APPLIED TO DECODERS | | | DATA MEMORY | | | | COEFF. MEM. ADDR. | DATA APPLIED TO SELECTOR, 48 LEVEL 1 | | | DATA APPLIED TO SELECTOR, 74 - LEVEL 2 | | DATA APPLIED TO SELECTOR, 98 LEVEL 3 | | DATA APPLIED TO | | OUT |
|---|---|---|---|---|---|---|---|---|---|---|---|---|---|---|---|---|---|---|---|---|
| | | | | | | "A" ADDR. | | "B" ADDR. | | | | | | | | | | DATA MEM "A" | DATA MEM "B" | |
| | | | LEV. 1 DEC'DR 30 | LEV. 2 DEC'DR 40 | LEV. 3 DEC'DR 44 | R | W | R | W | R | BUS 62 | BUS 64 | BUS 68 | BUS 86 | BUS 88 | BUS 100 | BUS 102 | BUS 106 | BUS 104 | BUS 107 |
| 33 | 6 | 10 | 6 | 6 | 6 | 16 | 13 | 16 | 13 | 1 | $S_{32}$ | $S_{16}$ | | $S_{14}$ | $S_{30}$ | $S_{13}+S_{29}$ | $S_{13}-S_{29}$ | $S_{13}-S_{29}$ | $S_{13}+S_{29}$ | |
| 34 | 7 | 10 | 10 | 6 | 6 | 1 | 14 | 9 | 14 | 2 | | $A'_1$ | $B'_9$ | $S_{15}$ | $S_{31}$ | $S_{14}+S_{30}$ | $S_{14}-S_{30}$ | $S_{14}-S_{30}$ | $S_{14}+S_{30}$ | |
| 35 | 7 | 10 | 10 | 6 | 6 | 2 | 15 | 10 | 15 | 2 | | $A'_2$ | $B'_{10}$ | $S_{16}$ | $S_{32}$ | $S_{15}+S_{31}$ | $S_{15}-S_{31}$ | $S_{15}-S_{31}$ | $S_{15}+S_{31}$ | |
| 36 | 7 | 10 | 10 | 10 | 6 | 3 | 16 | 11 | 16 | 2 | | $A'_3$ | $B'_{11}$ | $A'_1$ | $K_2 B'_9$ | $S_{16}+S_{32}$ | $S_{16}-S_{32}$ | $S_{16}-S_{32}$ | $S_{16}+S_{32}$ | |
| 37 | 8 | 11 | 10 | 10 | 10 | 4 | 1 | 12 | 9 | 2 | | $A'_4$ | $B'_{12}$ | $A'_2$ | $K_2 B'_{10}$ | $A'_1+K_2 B'_9$ | $A'_1-K_2 B'_9$ | $A_1-K_2 B_9$ | $A_1+K_2 B_9$ | * |
| 38 | 8 | 11 | 11 | 10 | 10 | 5 | 2 | 13 | 10 | 2 | | $A'_5$ | $B'_{13}$ | $A'_3$ | $K_2 B'_{11}$ | $A'_2+K_2 B'_{10}$ | $A'_2-K_2 B'_{10}$ | $A'_2-K_2 B'_{10}$ | $A'_2+K_2 B'_{10}$ | * |
| 39 | 8 | 11 | 11 | 10 | 10 | 6 | 3 | 14 | 11 | 2 | | $A'_6$ | $B'_{14}$ | $A'_4$ | $K_2 B'_{12}$ | $A'_3+K_2 B'_{11}$ | $A'_3-K_2 B'_{11}$ | $A'_3-K_2 B'_{11}$ | $A'_3+K_2 B'_{11}$ | * |
| 40 | 8 | 11 | 11 | 11 | 10 | 7 | 4 | 15 | 12 | 2 | | $A'_7$ | $B'_{15}$ | $A'_5$ | $K_2 B'_{13}$ | $A'_4+K_2 B'_{12}$ | $A'_4-K_2 B'_{12}$ | $A'_4-K_2 B'_{12}$ | $A'_4+K_2 B'_{12}$ | * |
| 41 | 9 | 12 | 11 | 11 | 11 | 8 | 5 | 16 | 13 | 2 | | $A'_8$ | $B'_{16}$ | $A'_6$ | $K_2 B'_{14}$ | $A'_5+K_2 B'_{13}$ | $A'_5-K_2 B'_{13}$ | $A'_5-K_2 B'_{13}$ | $A'_5+K_2 B'_{13}$ | |
| 42 | 7 | 12 | 12 | 11 | 11 | 9 | 6 | 1 | 14 | 3 | | $A'_9$ | $B'_1$ | $A'_7$ | $K_2 B'_{15}$ | $A'_6+K_2 B'_{14}$ | $A'_6-K_2 B'_{14}$ | $A'_6-K_2 B'_{14}$ | $A'_6+K_2 B'_{14}$ | |
| 43 | 7 | 12 | 12 | 11 | 11 | 10 | 7 | 2 | 15 | 3 | | $A'_{10}$ | $B'_2$ | $A'_8$ | $K_2 B'_{16}$ | $A'_7+K_2 B'_{15}$ | $A'_7-K_2 B'_{15}$ | $A'_7-K_2 B'_{15}$ | $A'_7+K_2 B'_{15}$ | |
| 44 | 7 | 12 | 12 | 12 | 11 | 11 | 8 | 3 | 16 | 3 | | $A'_{11}$ | $B'_3$ | $B'_1$ | $K_3 B'_9$ | $A'_8+K_2 B'_{16}$ | $A'_8-K_2 B'_{16}$ | $A'_8-K_2 B'_{16}$ | $A'_8+K_2 B'_{16}$ | |
| 45 | 8 | 13 | 12 | 12 | 12 | 12 | 9 | 4 | 1 | 3 | | $A'_{12}$ | $B'_4$ | $B'_2$ | $K_3 B'_{10}$ | $B'_1+K_3 B'_9$ | $B'_1-K_3 B'_9$ | $B'_1-K_3 B'_9$ | $B'_1+K_3 B'_9$ | * |
| 46 | 8 | 13 | 13 | 12 | 12 | 13 | 10 | 5 | 2 | 3 | | $A'_{13}$ | $B'_5$ | $B'_3$ | $K_3 B'_{11}$ | $B_2+K_3 B'_{10}$ | $B'_2-K_3 B'_{10}$ | $B'_2-K_3 B'_{10}$ | $B'_2+K_3 B'_{10}$ | * |
| 47 | 8 | 13 | 13 | 12 | 12 | 14 | 11 | 6 | 3 | 3 | | $A'_{14}$ | $B'_6$ | $B'_4$ | $K_3 B'_{12}$ | $B_3+K_3 B'_{11}$ | $B'_3-K_3 B'_{11}$ | $B'_3-K_3 B'_{11}$ | $B'_3+K_3 B'_{11}$ | * |
| 48 | 8 | 13 | 13 | 13 | 12 | 15 | 12 | 7 | 4 | 3 | | $A'_{15}$ | $B'_7$ | $B'_5$ | $K_3 B'_{13}$ | $B_4+K_3 B'_{12}$ | $B'_4-K_3 B'_{12}$ | $B'_4-K_3 B'_{12}$ | $B'_4+K_3 B'_{12}$ | * |

FIG. 11

| DURING CLOCK PERIOD NO. | DATA OUT OF MEM. ADDR. REG. 158 | DATA APPLIED TO REG. 128 | DATA APPLIED TO DECODERS | | | DATA MEMORY | | | | COEFF. MEM. ADDR. | DATA APPLIED TO SELECTOR, 48 LEVEL 1 | | | DATA APPLIED TO SELECTOR, 74-LEVEL 2 | | DATA APPLIED TO SELECTOR, 98 LEVEL 3 | | DATA APPLIED TO | | OUT |
|---|---|---|---|---|---|---|---|---|---|---|---|---|---|---|---|---|---|---|---|---|
| | | | | | | "A" ADDR. | | "B" ADDR. | | | | | | | | | | DATA MEM "A" | DATA MEM "B" | |
| | | | LEV. 1 DEC'DR 30 | LEV. 2 DEC'DR 40 | LEV. 3 DEC'DR 44 | R | W | R | W | R | BUS 62 | BUS 64 | BUS 68 | BUS 86 | BUS 88 | BUS 100 | BUS 102 | BUS 106 | BUS 104 | BUS 107 |
| 49 | 10 | 10 | 13 | 13 | 13 | 16 | 13 | 8 | 5 | 3 | | $A_{16}^{1}$ | $B_{8}^{1}$ | $B_{6}^{1}$ | $K_3A_{14}^{1}$ | $B_5^1+K_3A_{13}^1$ | $B_5^1-K_3A_{13}^1$ | $B_5^1-K_3A_{13}^1$ | $B_5^1+K_3A_{13}^1$ | |
| 50 | 11 | 10 | 10 | 13 | 13 | 1 | 14 | 13 | 6 | 4 | | $A_{1}^{1}$ | $B_{13}^{2}$ | $B_{7}^{1}$ | $K_3A_{15}^{1}$ | $B_6^1+K_3A_{14}^1$ | $B_6^1-K_3A_{14}^1$ | $B_6^1-K_3A_{14}^1$ | $B_6^1+K_3A_{14}^1$ | |
| 51 | 12 | 11 | 10 | 13 | 13 | 2 | 15 | 14 | 7 | 4 | | $A_{2}^{2}$ | $B_{14}^{2}$ | $B_{8}^{1}$ | $K_3A_{16}^{1}$ | $B_7^1+K_3A_{15}^1$ | $B_7^1-K_3A_{15}^1$ | $B_7^1-K_3A_{15}^1$ | $B_7^1+K_3A_{15}^1$ | |
| 52 | 12 | 11 | 11 | 10 | 13 | 3 | 16 | 15 | 8 | 4 | | $A_{3}^{2}$ | $B_{15}^{2}$ | $A_{1}^{2}$ | $K_4B_{13}^{2}$ | $B_8^1+K_3A_{16}^1$ | $B_8^1-K_3A_{16}^1$ | $B_8^1-K_3A_{16}^1$ | $B_8^1+K_3A_{16}^1$ | |
| 53 | 13 | 12 | 11 | 10 | 10 | 4 | 1 | 16 | 13 | 4 | | $A_{4}^{2}$ | $B_{16}^{2}$ | $A_{2}^{2}$ | $K_4B_{14}^{2}$ | $A_1^2+K_4B_{13}^2$ | $B_1^2-K_4A_{13}^2$ | $B_1^2+K_4A_{13}^2$ | $B_1^2-K_4A_{13}^2$ | * |
| 54 | 11 | 12 | 12 | 11 | 10 | 5 | 2 | 9 | 14 | 5 | | $A_{5}^{2}$ | $B_{9}^{2}$ | $A_{3}^{2}$ | $K_4B_{15}^{2}$ | $A_2^2+K_4B_{14}^2$ | $B_2^2-K_4A_{14}^2$ | $B_2^2+K_4A_{14}^2$ | $B_2^2-K_4A_{14}^2$ | * |
| 55 | 12 | 13 | 12 | 11 | 11 | 6 | 3 | 10 | 15 | 5 | | $A_{6}^{2}$ | $B_{10}^{2}$ | $A_{4}^{2}$ | $K_4B_{16}^{2}$ | $A_3^2+K_4B_{15}^2$ | $B_3^2-K_4A_{15}^2$ | $B_3^2-K_4A_{15}^2$ | $B_3^2+K_4A_{15}^2$ | |
| 56 | 12 | 13 | 13 | 12 | 11 | 7 | 4 | 11 | 16 | 5 | | $A_{7}^{2}$ | $B_{11}^{2}$ | $B_{9}^{2}$ | $K_5A_{5}^{2}$ | $A_4^2+K_4B_{16}^2$ | $B_4^2-K_4A_{16}^2$ | $B_4^2-K_4A_{16}^2$ | $B_4^2+K_4A_{16}^2$ | |
| 57 | 13 | 10 | 13 | 12 | 12 | 8 | 5 | 12 | 9 | 5 | | $A_{8}^{2}$ | $B_{12}^{2}$ | $B_{10}^{2}$ | $K_5A_{6}^{2}$ | $B_9^2+K_5A_5^2$ | $B_9^2-K_5A_5^2$ | $B_9^2+K_5A_5^2$ | $B_9^2-K_5A_5^2$ | * |
| 58 | 11 | 10 | 10 | 13 | 12 | 9 | 6 | 5 | 10 | 6 | | $A_{9}^{2}$ | $B_{5}^{2}$ | $B_{11}^{2}$ | $K_5A_{7}^{2}$ | $B_{10}^2+K_5A_6^2$ | $B_{10}^2-K_5A_6^2$ | $B_{10}^2+K_5A_6^2$ | $B_{10}^2-K_5A_6^2$ | * |
| 59 | 12 | 11 | 10 | 13 | 13 | 10 | 7 | 6 | 11 | 6 | | $A_{10}^{2}$ | $B_{6}^{2}$ | $B_{12}^{2}$ | $K_5A_{8}^{2}$ | $B_{11}^2+K_5A_7^2$ | $B_{11}^2-K_5A_7^2$ | $B_{11}^2-K_5A_7^2$ | $B_{11}^2+K_5A_7^2$ | |
| 60 | 12 | 11 | 11 | 10 | 13 | 11 | 8 | 7 | 12 | 6 | | $A_{11}^{2}$ | $B_{7}^{2}$ | $A_{9}^{2}$ | $K_6B_{5}^{2}$ | $B_{12}^2+K_5A_8^2$ | $B_{12}^2-K_5A_8^2$ | $B_{12}^2-K_5A_8^2$ | $B_{12}^2+K_5A_8^2$ | |
| 61 | 13 | 12 | 11 | 10 | 10 | 12 | 9 | 8 | 5 | 6 | | $A_{12}^{2}$ | $B_{8}^{2}$ | $A_{10}^{2}$ | $K_6B_{6}^{2}$ | $A_9^2+K_6B_5^2$ | $B_9^2-K_6A_5^2$ | $B_9^2+K_6A_5^2$ | $B_9^2-K_6A_5^2$ | * |
| 62 | 11 | 12 | 12 | 11 | 10 | 13 | 10 | 1 | 6 | 7 | | $A_{13}^{2}$ | $B_{1}^{2}$ | $A_{11}^{2}$ | $K_6B_{7}^{2}$ | $A_{10}^2+K_6B_6^2$ | $B_{10}^2-K_6A_6^2$ | $B_{10}^2+K_6A_6^2$ | $B_{10}^2-K_6A_6^2$ | * |
| 63 | 12 | 13 | 12 | 11 | 11 | 14 | 11 | 2 | 7 | 7 | | $A_{14}^{2}$ | $B_{2}^{2}$ | $A_{12}^{2}$ | $K_6B_{8}^{2}$ | $A_1^2+K_6B_7^2$ | $B_1^2-K_6A_7^2$ | $B_1^2-K_6A_7^2$ | $B_1^2+K_6A_7^2$ | |
| 64 | 12 | 13 | 13 | 12 | 11 | 15 | 12 | 3 | 8 | 7 | | $A_{15}^{2}$ | $B_{3}^{2}$ | $B_{1}^{2}$ | $K_7A_{13}^{2}$ | $A_{12}^2+K_6B_8^2$ | $B_{12}^2-K_6A_8^2$ | $B_{12}^2-K_6A_8^2$ | $B_{12}^2+K_6A_8^2$ | |

FIG. 12

| DURING CLOCK PERIOD NO. | DATA OUT OF MEM. ADDR. REG 158 | DATA APPLIED TO REG 128 | DATA APPLIED TO DECODERS | | | DATA MEMORY | | | | COEFF. MEM. ADDR. | DATA APPLIED TO SELECTOR, 48 LEVEL 1 | | | DATA APPLIED TO SELECTOR, 74-LEVEL 2 | | DATA APPLIED TO SELECTOR, 98 LEVEL 3 | | DATA APPLIED TO | | OUT |
|---|---|---|---|---|---|---|---|---|---|---|---|---|---|---|---|---|---|---|---|---|
| | | | | | | "A" ADDR. | | "B" ADDR. | | | | | | | | | | DATA MEM "A" | DATA MEM "B" | |
| | | | LEV. 1 DEC'DR 30 | LEV. 2 DEC'DR 40 | LEV. 3 DEC'DR 44 | R | W | R | W | R | BUS 62 | BUS 64 | BUS 68 | BUS 86 | BUS 88 | BUS 100 | BUS 102 | BUS 106 | BUS 104 | BUS 107 |
| 65 | 14 | 10 | 13 | 12 | 12 | 16 | 13 | 4 | 1 | 7 | | $A^2_{16}$ | $B^2_4$ | $B^2_2$ | $K_7A_{14}$ | $B^2_1+K_7A_{13}$ | $B^2_1-K_7A_{13}$ | $B^2_1+K_7A_{13}$ | $B^2_1-K_7A_{13}$ | * |
| 66 | 15 | 11 | 10 | 13 | 12 | 1 | 14 | 15 | 2 | 8 | | $A^3_1$ | $B^3_{15}$ | $B^2_3$ | $K_7A_{15}$ | $B^2_2+K_7A_{14}$ | $B^2_2-K_7A_{14}$ | $B^2_2+K_7A_{14}$ | $B^2_2-K_7A_{14}$ | * |
| 67 | 16 | 12 | 11 | 13 | 13 | 2 | 15 | 16 | 3 | 8 | | $A^3_2$ | $B^3_{16}$ | $B^2_4$ | $K_7A_{16}$ | $B^2_3+K_7A_{15}$ | $B^2_3-K_7A_{15}$ | $B^2_3-K_7A_{15}$ | $B^2_3+K_7A_{15}$ | |
| 68 | 15 | 13 | 12 | 10 | 13 | 3 | 16 | 13 | 4 | 9 | | $A^3_3$ | $B^3_{13}$ | $A^3_1$ | $K_8B^3_{15}$ | $B^2_4+K_7A_{16}$ | $B^2_4-K_7A_{16}$ | $B^2_4-K_7A_{16}$ | $B^2_4+K_7A_{16}$ | |
| 69 | 16 | 10 | 13 | 11 | 10 | 4 | 1 | 14 | 15 | 9 | | $A^3_4$ | $B^3_{14}$ | $A^3_2$ | $K_8B^3_{16}$ | $A^3_1+K_8B^3_{15}$ | $B^3_1-K_8B^3_{15}$ | $B^3_1+K_8B^3_{15}$ | $B^3_1-K_8B^3_{15}$ | * |
| 70 | 15 | 11 | 10 | 12 | 11 | 5 | 2 | 11 | 16 | 10 | | $A^3_5$ | $B^3_{11}$ | $B^3_{13}$ | $K_9A^3_3$ | $A^3_2+K_8B^3_{16}$ | $B^3_2-K_8B^3_{16}$ | $B^3_2-K_8B^3_{16}$ | $B^3_2+K_8B^3_{16}$ | |
| 71 | 16 | 12 | 11 | 13 | 12 | 6 | 3 | 12 | 13 | 10 | | $A^3_6$ | $B^3_{12}$ | $B^3_{14}$ | $K_9A^3_4$ | $B^3_{13}+K_9A^3_3$ | $B^3_{13}-K_9A^3_3$ | $B^3_{13}+K_9A^3_3$ | $B^3_{13}-K_9A^3_3$ | * |
| 72 | 15 | 13 | 12 | 10 | 13 | 7 | 4 | 9 | 14 | 11 | | $A^3_7$ | $B^3_9$ | $A^3_5$ | $K_{10}B^3_{11}$ | $B^3_{14}+K_9A^3_4$ | $B^3_{14}-K_9A^3_4$ | $B^3_{14}-K_9A^3_4$ | $B^3_{14}+K_9A^3_4$ | |
| 73 | 16 | 10 | 13 | 11 | 10 | 8 | 5 | 10 | 11 | 11 | | $A^3_8$ | $B^3_{10}$ | $A^3_6$ | $K_{10}B^3_{12}$ | $A^3_5+K_{10}B^3_{11}$ | $B^3_5-K_{10}B^3_{11}$ | $B^3_5+K_{10}B^3_{11}$ | $B^3_5-K_{10}B^3_{11}$ | * |
| 74 | 15 | 11 | 10 | 12 | 11 | 9 | 6 | 7 | 12 | 12 | | $A^3_9$ | $B^3_7$ | $B^3_9$ | $K_{11}A^3_7$ | $A^3_6+K_{10}B^3_{12}$ | $B^3_6-K_{10}B^3_{12}$ | $B^3_6-K_{10}B^3_{12}$ | $B^3_6+K_{10}B^3_{12}$ | |
| 75 | 16 | 12 | 11 | 13 | 12 | 10 | 7 | 8 | 9 | 12 | | $A^3_{10}$ | $B^3_8$ | $B^3_{10}$ | $K_{11}A^3_8$ | $B^3_9+K_{11}A^3_7$ | $B^3_9-K_{11}A^3_7$ | $B^3_9+K_{11}A^3_7$ | $B^3_9-K_{11}A^3_7$ | * |
| 76 | 15 | 13 | 12 | 10 | 13 | 11 | 8 | 5 | 10 | 13 | | $A^3_{11}$ | $B^3_5$ | $A^3_9$ | $K_{12}B^3_7$ | $B^3_{10}+K_{11}A^3_8$ | $B^3_{10}-K_{11}A^3_8$ | $B^3_{10}-K_{11}A^3_8$ | $B^3_9+K_{11}A^3_7$ | |
| 77 | 16 | 10 | 13 | 11 | 10 | 12 | 9 | 6 | 7 | 13 | | $A^3_{12}$ | $B^3_6$ | $A^3_{10}$ | $K_{12}B^3_8$ | $A^3_9+K_{12}B^3_7$ | $B^3_9-K_{12}B^3_7$ | $B^3_9+K_{12}B^3_7$ | $B^3_9-K_{12}B^3_7$ | * |
| 78 | 15 | 11 | 10 | 12 | 11 | 13 | 10 | 3 | 8 | 14 | | $A^3_{13}$ | $B^3_3$ | $B^3_5$ | $K_{13}A^3_{11}$ | $A^3_{10}+K_{12}B^3_8$ | $B^3_{10}-K_{12}B^3_8$ | $B^3_{10}-K_{12}B^3_8$ | $B^3_{10}+K_{12}B^3_8$ | |
| 79 | 16 | 12 | 11 | 13 | 12 | 14 | 11 | 4 | 5 | 14 | | $A^3_{14}$ | $B^3_4$ | $B^3_6$ | $K_{13}A^3_{12}$ | $B^3_5+K_{13}A^3_{11}$ | $B^3_5-K_{13}A^3_{11}$ | $B^3_5+K_{13}A^3_{11}$ | $B^3_5-K_{13}A^3_{11}$ | X |
| 80 | 15 | 13 | 12 | 10 | 13 | 15 | 12 | 1 | 6 | 15 | | $A^3_{15}$ | $B^3_1$ | $A^3_{13}$ | $K_{14}B^3_3$ | $B^3_6+K_{13}A^3_{12}$ | $B^3_6-K_{13}A^3_{12}$ | $B^3_6-K_{13}A^3_{12}$ | $B^3_6+K_{13}A^3_{12}$ | |

FIG. 13

| DURING CLOCK PERIOD NO | DATA OUT OF MEM. ADDR. REG. 158 | DATA APPLIED TO REG 128 | DATA APPLIED TO DECODERS: LEV. 1 DEC'DR 30 | DATA APPLIED TO DECODERS: LEV. 2 DEC'DR 40 | DATA APPLIED TO DECODERS: LEV. 2 DEC'DR 44 | DATA MEMORY "A" ADDR: R | DATA MEMORY "A" ADDR: W | DATA MEMORY "B" ADDR: R | DATA MEMORY "B" ADDR: W | COEFF. MEM. ADDR.: R | DATA APPLIED TO SELECTOR, 48 LEVEL 1: BUS 62 | DATA APPLIED TO SELECTOR, 48 LEVEL 1: BUS 64 | DATA APPLIED TO SELECTOR, 48 LEVEL 1: BUS 68 | DATA APPLIED TO SELECTOR, 74-LEVEL 2: BUS 86 | DATA APPLIED TO SELECTOR, 74-LEVEL 2: BUS 88 | DATA APPLIED TO SELECTOR, 98 LEVEL 3: BUS 100 | DATA APPLIED TO SELECTOR, 98 LEVEL 3: BUS 102 | DATA APPLIED TO DATA MEM "A": BUS 106 | DATA APPLIED TO DATA MEM "B": BUS 104 | OUT: BUS 107 |
|---|---|---|---|---|---|---|---|---|---|---|---|---|---|---|---|---|---|---|---|---|
| 81 | 17 | 10 | 13 | 11 | 10 | 16 | 13 | 2 | 3 | 15 | | $A^3_{16}$ | $B^3_2$ | $A^3_{14}$ | $K_{14}B^3_4$ | $A^3_{13}+K_{14}B^3_3$ | $A^3_{13}-K_{14}B^3_3$ | $A^3_{13}+K_{14}B^3_3$ | $A^3_{13}-K_{14}B^3_3$ | * |
| 82 | 18 | 12 | 10 | 12 | 11 | 1 | 14 | 16 | 4 | 16 | | $A^4_1$ | $B^4_{16}$ | $B^3_1$ | $K_{15}A^3_{15}$ | $A^3_{14}+K_{14}B^3_4$ | $A^3_{14}-K_{14}B^3_4$ | $A^3_{14}-K_{14}B^3_4$ | $A^3_{14}+K_{14}B^3_4$ | |
| 83 | 19 | 10 | 12 | 13 | 12 | 2 | 15 | 15 | 1 | 17 | | $A^4_2$ | $B^4_{15}$ | $B^3_2$ | $K_{15}A^3_{16}$ | $B^3_1+K_{15}A^3_{15}$ | $B^3_1-K_{15}A^3_{15}$ | $B^3_1+K_{15}A^3_{15}$ | $B^3_1-K_{15}A^3_{15}$ | * |
| 84 | 18 | 12 | 10 | 10 | 13 | 3 | 16 | 14 | 2 | 18 | | $A^4_3$ | $B^4_{14}$ | $A^4_1$ | $K_{16}B^4_{16}$ | $B^3_2+K_{15}A^3_{16}$ | $B^3_2-K_{15}A^3_{16}$ | $B^3_2-K_{15}A^3_{16}$ | $B^3_2+K_{15}A^3_{16}$ | |
| 85 | 19 | 10 | 12 | 12 | 10 | 4 | 1 | 13 | 16 | 19 | | $A^4_4$ | $B^4_{13}$ | $B^4_{15}$ | $K_{17}A^4_2$ | $A^4_1+K_{16}B^4_{16}$ | $A^4_1-K_{16}B^4_{16}$ | $A^4_1+K_{16}B^4_{16}$ | $A^4_1-K_{16}B^4_{16}$ | $A^5_1$ |
| 86 | 18 | 12 | 10 | 10 | 12 | 5 | 2 | 12 | 15 | 20 | | $A^4_5$ | $B^4_{12}$ | $A^4_3$ | $K_{18}B^4_{14}$ | $B^4_{15}+K_{17}A^4_2$ | $B^4_{15}-K_{17}A^4_2$ | $B^4_{15}+K_{17}A^4_2$ | $B^4_{15}-K_{17}A^4_2$ | $A^5_2$ |
| 87 | 19 | 10 | 12 | 12 | 10 | 6 | 3 | 11 | 14 | 21 | | $A^4_6$ | $B^4_{11}$ | $B^4_{13}$ | $K_{19}A^4_4$ | $A^4_3+K_{18}B^4_{14}$ | $A^4_3-K_{18}B^4_{14}$ | $A^4_3+K_{18}B^4_{14}$ | $A^4_3-K_{18}B^4_{14}$ | $A^5_3$ |
| 88 | 18 | 12 | 10 | 10 | 12 | 7 | 4 | 10 | 13 | 22 | | $A^4_7$ | $B^4_{10}$ | $A^4_5$ | $K_{20}B^4_{12}$ | $B^4_{13}+K_{19}A^4_4$ | $B^4_{13}-K_{19}A^4_4$ | $B^4_{13}+K_{19}A^4_4$ | $B^4_{13}-K_{19}A^4_4$ | $A^5_4$ |
| 89 | 19 | 10 | 12 | 12 | 10 | 8 | 5 | 9 | 12 | 23 | | $A^4_8$ | $B^4_9$ | $B^4_{11}$ | $K_{21}A^4_6$ | $A^4_5+K_{20}B^4_{12}$ | $A^4_5-K_{20}B^4_{12}$ | $A^4_5+K_{20}B^4_{12}$ | $A^4_5-K_{20}B^4_{12}$ | $A^5_5$ |
| 90 | 18 | 12 | 10 | 10 | 12 | 9 | 6 | 8 | 11 | 24 | | $A^4_9$ | $B^4_8$ | $A^4_7$ | $K_{22}B^4_{10}$ | $B^4_{11}+K_{21}A^4_6$ | $B^4_{11}-K_{21}A^4_6$ | $B^4_{11}+K_{21}A^4_6$ | $B^4_{11}-K_{21}A^4_6$ | $A^5_6$ |
| 91 | 19 | 10 | 12 | 12 | 10 | 10 | 7 | 7 | 10 | 25 | | $A^4_{10}$ | $B^4_7$ | $B^4_9$ | $K_{23}A^4_8$ | $A^4_7+K_{22}B^4_{10}$ | $A^4_7-K_{22}B^4_{10}$ | $A^4_7+K_{22}B^4_{10}$ | $A^4_7-K_{22}B^4_{10}$ | $A^5_7$ |
| 92 | 18 | 12 | 10 | 10 | 12 | 11 | 8 | 6 | 9 | 26 | | $A^4_{11}$ | $B^4_6$ | $A^4_9$ | $K_{24}B^4_8$ | $B^4_9+K_{23}A^4_8$ | $B^4_9-K_{23}A^4_8$ | $B^4_9+K_{23}A^4_8$ | $B^4_9-K_{23}A^4_8$ | $A^5_8$ |
| 93 | 19 | 10 | 12 | 12 | 10 | 12 | 9 | 5 | 8 | 27 | | $A^4_{12}$ | $B^4_5$ | $B^4_7$ | $K_{25}A^4_{10}$ | $A^4_9+K_{24}B^4_8$ | $A^4_9-K_{24}B^4_8$ | $A^4_9+K_{24}B^4_8$ | $A^4_9-K_{24}B^4_8$ | $A^5_9$ |
| 94 | 18 | 12 | 10 | 10 | 12 | 13 | 10 | 4 | 7 | 28 | | $A^4_{13}$ | $B^4_4$ | $A^4_{11}$ | $K_{26}B^4_6$ | $B^4_7+K_{25}A^4_{10}$ | $B^4_7-K_{25}A^4_{10}$ | $B^4_7+K_{25}A^4_{10}$ | $B^4_7-K_{25}A^4_{10}$ | $A^5_{10}$ |
| 95 | 19 | 10 | 12 | 12 | 10 | 14 | 11 | 3 | 6 | 29 | | $A^4_{14}$ | $B^4_3$ | $B^4_5$ | $K_{12}A^{14}_{12}$ | $A^4_{11}+K_{26}B^4_6$ | $A^4_{11}-K_{25}B^4_6$ | $A^4_{11}+K_{26}B^4_6$ | $A^4_{11}-K_{26}B^4_6$ | $A^5_{11}$ |
| 96 | 18 | 12 | 10 | 10 | 12 | 15 | 12 | 2 | 5 | 30 | | $A^4_{15}$ | $B^4_2$ | $A^4_{13}$ | $K_{28}B^4_4$ | $B^4_5+K_{12}A^4_{12}$ | $B^4_5-K_{12}A^4_{12}$ | $B^4_5-K_{12}A^4_{12}$ | $B^4_5-K_{12}A^4_{12}$ | $A^5_{12}$ |

FIG. 14

| DURING CLOCK PERIOD NO | DATA OUT OF MEM ADDR REG 158 | DATA APPLIED TO REG. 128 | DATA APPLIED TO DECODERS | | | DATA MEMORY | | | | COEFF. MEM. ADDR. | DATA APPLIED TO SELECTOR, 48 LEVEL 1 | | | DATA APPLIED TO SELECTOR 74-LEVEL 2 | | DATA APPLIED TO SELECTOR, 98 LEVEL 3 | | DATA APPLIED TO | | OUT |
|---|---|---|---|---|---|---|---|---|---|---|---|---|---|---|---|---|---|---|---|---|
| | | | | | | "A" ADDR. | | "B" ADDR. | | | | | | | | | | DATA MEM "A" | DATA MEM "B" | |
| | | | LEV 1 DEC'DR 30 | LEV 2 DECDR 40 | LEV 3 DECDR 44 | R | W | R | W | R | BUS 62 | BUS 64 | BUS 68 | BUS 86 | BUS 88 | BUS 100 | BUS 102 | BUS 106 | BUS 104 | BUS 107 |
| 97 | 20 | 1 | 12 | 12 | 10 | 16 | 13 | 1 | 4 | 31 | | $A^4_{16}$ | $B^4_1$ | $B^4_3$ | $K_{29}A^4_{14}$ | $A^4_{13}+K_{28}B^4_4$ | $A^4_{13}-K_{28}B^4_4$ | $A^4_{13}+K_{28}B^4_4$ | $A^4_{13}-K_{28}B^4_4$ | $A^5_{13}$ |
| 98 | 21 | 1 | 1 | 10 | 12 | | 14 | 16 | 3 | | | | $B^5_{16}$ | $A^4_{15}$ | $K_{30}B^4_2$ | $A^4_{15}+K_{29}A^4_{14}$ | $A^4_{15}-K_{29}A^4_{14}$ | $A^4_{15}+K_{29}A^4_{14}$ | $A^4_{15}-K_{29}A^4_{14}$ | $A^5_{14}$ |
| 99 | 21 | 1 | 1 | 12 | 10 | | 15 | 15 | 2 | | | | $B^5_{15}$ | $B^4_1$ | $K_{31}A^4_{16}$ | $A^4_{15}+K_{30}B^4_4$ | $A^4_{15}-K_{30}B^4_4$ | $A^4_{15}+K_{30}B^4_4$ | $A^4_{15}-K_{30}B^4_4$ | $A^5_{15}$ |
| 100 | 21 | 1 | 1 | 1 | 12 | | 16 | 14 | 1 | | | | $B^5_{14}$ | $B^5_{16}$ | | $B^4_1+K_{31}A^4_{16}$ | $B^4_1-K_{31}A^4_{16}$ | $B^4_1+K_{31}A^4_{16}$ | $B^4_1-K_{31}A^4_{16}$ | $A^5_{16}$ |
| 101 | 21 | 1 | 1 | 1 | 1 | | | 13 | | | | | $B^5_{13}$ | $B^5_{15}$ | | | $B^5_{16}$ | | | $B^5_{16}$ |
| 102 | 21 | 1 | 1 | 1 | 1 | | | 12 | | | | | $B^5_{12}$ | $B^5_{14}$ | | | $B^5_{15}$ | | | $B^5_{15}$ |
| 103 | 21 | 1 | 1 | 1 | 1 | | | 11 | | | | | $B^5_{11}$ | $B^5_{13}$ | | | $B^5_{14}$ | | | $B^5_{14}$ |
| 104 | 21 | 1 | 1 | 1 | 1 | | | 10 | | | | | $B_{10}$ | $B_{12}$ | | | $B^5_{13}$ | | | $B^5_{13}$ |
| 105 | 21 | 1 | 1 | 1 | 1 | | | 9 | | | | | $B^5_9$ | $B^5_{11}$ | | | $B^5_{12}$ | | | $B^5_{12}$ |
| 106 | 21 | 1 | 1 | 1 | 1 | | | 8 | | | | | $B^5_8$ | $B^5_{10}$ | | | $B^5_{11}$ | | | $B^5_{11}$ |
| 107 | 21 | 1 | 1 | 1 | 1 | | | 7 | | | | | $B^5_7$ | $B^5_9$ | | | $B^5_{10}$ | | | $B^5_{10}$ |
| 108 | 21 | 1 | 1 | 1 | 1 | | | 6 | | | | | $B^5_6$ | $B^5_8$ | | | $B^5_9$ | | | $B^5_9$ |
| 109 | 21 | 1 | 1 | 1 | 1 | | | 5 | | | | | $B^5_5$ | $B^5_7$ | | | $B^5_8$ | | | $B^5_8$ |
| 110 | 21 | 1 | 1 | 1 | 1 | | | 4 | | | | | $B^5_4$ | $B^5_6$ | | | $B^5_7$ | | | $B^5_7$ |
| 111 | 21 | 1 | 1 | 1 | 1 | | | 3 | | | | | $B^5_3$ | $B^5_5$ | | | $B^5_6$ | | | $B^5_6$ |
| 112 | 21 | 1 | 1 | 1 | 1 | | | 2 | | | | | $B^5_2$ | $B^5_4$ | | | $B^5_5$ | | | $B^5_5$ |

FIG. 15

| DURING CLOCK PERIOD NO. | DATA OUT OF MEM. ADDR. REG. 158 | DATA APPLIED TO REG 128 | DATA APPLIED TO DECODERS | | | DATA MEMORY | | | | COEFF. MEM. ADDR. | DATA APPLIED TO SELECTOR, 48 LEVEL 1 | | | DATA APPLIED TO SELECTOR, 74-LEVEL 2 | | DATA APPLIED TO SELECTOR, 98 LEVEL 3 | | DATA APPLIED TO | | OUT |
|---|---|---|---|---|---|---|---|---|---|---|---|---|---|---|---|---|---|---|---|---|
| | | | | | | "A" ADDR. | | "B" ADDR. | | | | | | | | | | DATA MEM. "A" | DATA MEM "B" | |
| | | | LEV. 1 DEC'DR 30 | LEV. 2 DEC'DR 40 | LEV. 3 DEC DR 44 | R | W | R | W | R | BUS 62 | BUS 64 | BUS 68 | BUS 86 | BUS 88 | BUS 100 | BUS 102 | BUS 106 | BUS 104 | BUS 107 |
| 113 | 22 | | 1 | 1 | 1 | | | 1 | | | | | $B_1^5$ | | $B_3^5$ | | $B_4^5$ | | | $B_4^5$ |
| 114 | | | | 1 | 1 | | | | | | | | | | $B_2^5$ | | $B_3^5$ | | | $B_3^5$ |
| 115 | | | | | 1 | | | | | | | | | | $B_1^5$ | | $B_2^5$ | | | $B_2^5$ |
| 116 | | | | | 1 | | | | | | | | | | | | $B_1^5$ | | | $B_1^5$ |
| 117 | | | | | | | | | | | | | | | | | | | | |
| 118 | | | | | | | | | | | | | | | | | | | | |
| 119 | | | | | | | | | | | | | | | | | | | | |

FIG 16

| PROGRAM CONTROL SEQUENCE FLOW FIELD | | | | MACRO INSTRUCTION FIELD | | DATA MEMORY "A" ADDRESS FIELD | | DATA MEMORY "B" ADDRESS FIELD | | COEFF. MEM. ADDRESS FIELD | |
|---|---|---|---|---|---|---|---|---|---|---|---|
| MEM. LOC. | NEXT ADD. | INSTRUCTION No. TIMES | INSTRUCTION CONTROL | No. | CONTROL "P" | LOC. | INIT/INCR | LOC | INIT/INCR | LOC | INIT/INCR |
| 22 | 23 | — | TRA | 1 | 1 | 0 | INIT | — | — | 100 | INIT |
| 23 | 24 | R | LUP | 1 | 1 | 1 | INCR | — | — | 0 | INCR |
| 24 | 25 | Q | LUP | — | — | — | — | — | — | — | — |
| 25 | 26 | — | TRA | 2 | 1 | 0 | INIT | — | — | 1 | INCR |
| 26 | 27 | R-1 | LUP | 2 | 1 | 1 | INCR | — | — | 0 | INCR |
| 27 | 24 | N | XJP | 2 | 1 | 1 | INCR | — | — | 0 | INCR |

FIG. 18

PIPELINE SIGNAL PROCESSOR

BACKGROUND OF THE INVENTION

This invention relates generally to pipeline digital processing systems, and more particularly to programmable pipeline signal processors which are adapted for use in radar and/or sonar systems to provide a wide range of real time signal processing tasks.

As is known in the art, in recent years many large radar systems have been required to perform a variety of tasks using real time digital processing techniques. The digital processing in such systems involves the analysis of a large volume of data. In performing such analysis a digital signal processor may be required to perform a number of signal processing functions, such as: Pulse compression by means of convolution or discrete Fast Fourier Transform (FFT) techniques; Doppler processing; moving target indication (MTI); constant false alarm rate averaging (CFAR); or monopulse alignment calibration.

One suggested digital signal processor incorporates the architecture of a general purpose computer. Data are fed into a main memory. An arithmetic section is included sequentially to perform calculations on the data. Each arithmetic calculation (i.e., add or subtract) is controlled by a separate instruction. A sequence of instructions for any group of calculations, for example, those required for a desired transform, forms a subroutine and a particular sequence of subroutines corresponds to one processing mode or signal processing function. While such architecture requires no specialized (or "hard-wired") hardware design, sufficient computation time must be available so that the time interval between successive sets of data be sufficiently long to enable performance of all required calculations during such time interval.

Another suggested approach includes the use of sequentially arranged "pipeline" processing modules. Each one of such modules is designed to perform only one of a variety of signal processing functions. That is, the configurations of the arithmetic and memory elements within each module is tailored specifically to its assigned task or signal processing function. Each module performs calculations in accordance with its hardwired configuration and then passes the result to the next succeeding, specially configured, hardwired module. While this type of architecture is not generally speedlimited, (each module being capable of handling a relatively high data rate) it is very inefficient from a hardware utilization aspect. That is, because each module is highly specialized and specific in design, many different modules, each of a separate design, are required in any practical application. Consequently, if one signal processing function is changed, an entirely new module design may be required. Further, any such design change may also require alterations in the design of other modules, as where a change in sequence of the data processing function is desired.

In this connection a known signal processor includes a pipeline arithmetic unit which is adapted to have the processing elements therein interconnected in a selected one of a number of possible configurations, such configuration being selected by a control signal supplied in accordance with a stored program. Once selected in a particular configuration, data associated with a particular process are sequentially fed through the various processing elements. After completion of such process the arithmetic unit may be reconfigured in accordance with a different control signal to a new configuration for processing data associated with a second process. While such signal processor obviates many of the disadvantages in the above suggested approaches, in many applications (as those requiring real time processing) it is undesirable that the arithmetic unit be confined to one selected configuration for all the data being processed concurrently therein. This is so because the arithmetic unit in such known pipeline signal processor must complete one process before it can be reconfigured to a different process even though a portion of the data associated with the second process is available for processing by the arithmetic unit at the same time the last portion of the data associated with the first process is being processed by the arithmetic unit.

SUMMARY OF THE INVENTION

With this background of the invention in mind, it is an object of this invention to provide an improved digital signal processor which is adapted to perform a variety of real time signal processing functions, such processor having greater speed and flexibility than has been known heretofore.

This and other objects of the invention are attained generally by providing a signal processor including a programmable arithmetic controller and a pipeline arithmetic unit controlled by such controller. The arithmetic unit includes a plurality of serially coupled processing levels and the arithmetic controller includes a corresponding plurality of serially coupled control levels, each one of such control levels being coupled to a corresponding one of the processing levels. Each one of the processing levels passes digital data applied thereto in accordance with a control instruction applied to such processing level by the arithmetic controller. As data passes through the processing levels of the arithmetic unit, the control instruction associated with such data passes through corresponding control levels of the arithmetic controller so that the control instruction "follows" the data associated therewith as both pass through the processor.

BRIEF DESCRIPTION OF THE DRAWINGS

The foregoing features of this invention, as well as the invention itself, may be more fully understood from the following description read together with the accompanying drawings, in which:

FIG. 2 is a block diagram of an exemplary data memory address generator used in the signal processor of FIG. 1;

FIG. 3 is a block diagram of the macrocontrol generator used in the signal processor of FIG. 1;

FIG. 4 is a table of the instructions stored in the macromemory of the macrocontrol generator of FIG. 3;

Figure 1:
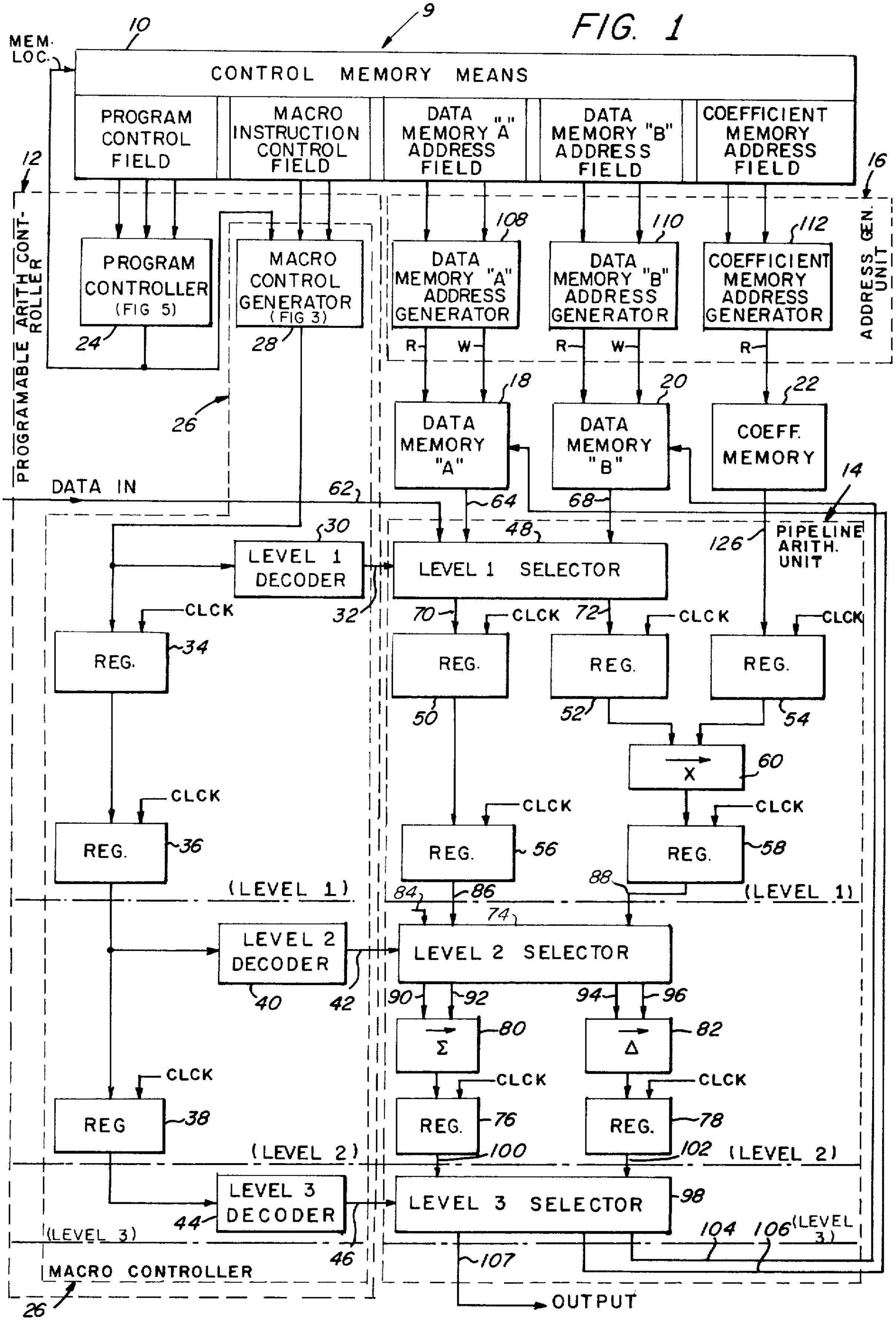
FIG. 1 is a block diagram of a signal processor according to the invention.
Figure 7:
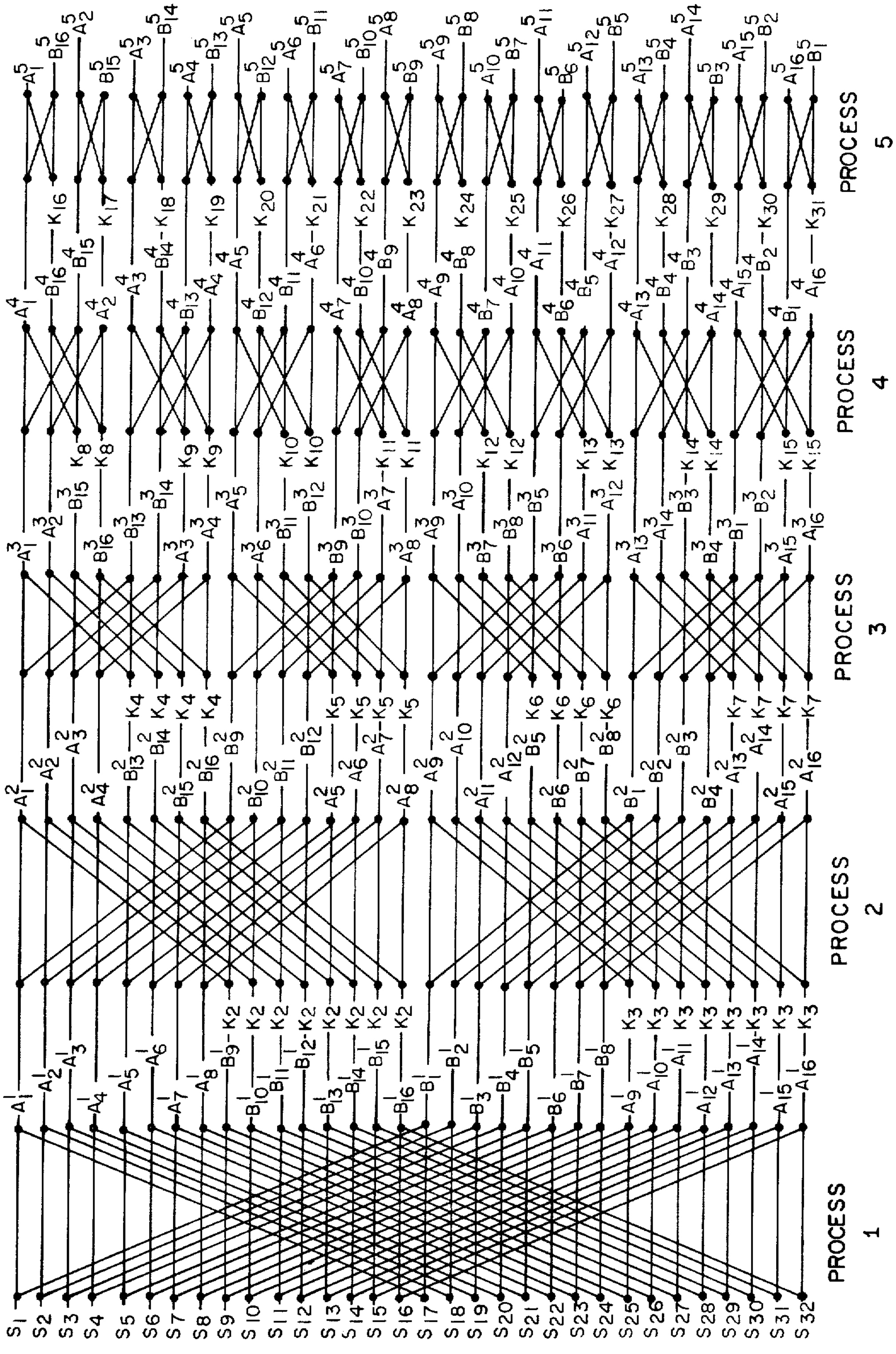
Figure 17:
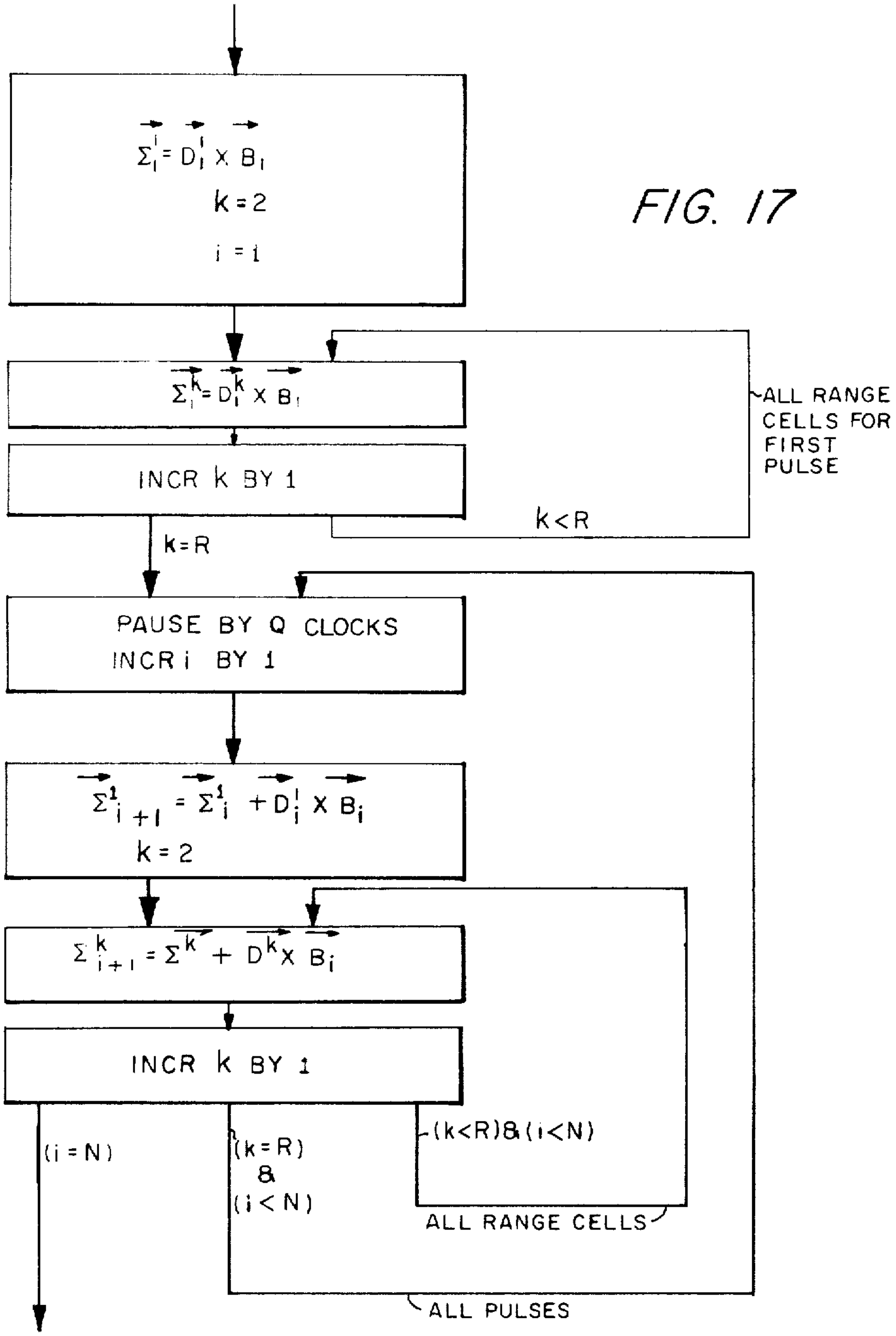

FIGS. *6a* – *6c* are block diagrams showing the configurations of the level 1 decoder and selector, level 2 decoder and selector, level 3 decoder and selector, respectively, used in the signal processor of FIG. 1, in response to various macroinstruction numbers;

FIG. 7 is a flow diagram of a 32 point Fast Fourier Transform (FFT) algorithm;

FIG. 8 is a table of instructions stored in the control memory means of the signal processor of FIG. 1, such instructions being associated with the 32 point FFT flow diagram of FIG. 7;

FIGS. 9–16 are charts showing the condition, where relevant, of the various elements of the signal processor of FIG. 1 as such processor executes the 32 point FFT process;

FIG. 17 is a program flow diagram of an MTI (Moving Target Indicator) process; and, FIG. 18 is a table of instructions stored in the control memory means of the signal processor of FIG. 1, such instructions being associated with the MTI process of FIG. 17.

DESCRIPTION OF THE PREFERRED EMBODIMENT

General

Referring now to FIG. 1, a signal processor 9 is shown to include a control memory means 10, a programmable arithmetic controller 12, a pipeline arithmetic unit 14, an address generator unit 16, a data memory "A" 18, a data memory "B" 20 and a coefficient memory 22, all arranged as shown in a manner to be described to perform any one of a repertoire of signal processing functions.

The control memory means 10 here includes a core memory, addressing means, and reading means, the details of which are not shown, all being of conventional design and arrangement, to store the repertoire of signal processing functions (i.e., MTI, FFT, etc.). Each one of the signal processing functions is comprised of a set of stored digital words or instructions. Each one of the digital words includes a program control field, a macroinstruction control field, a data memory "A" address field, a data memory "B" address field, and a coefficient memory address field.

Programmable Arithmetic Controller

The programmable arithmetic controller 12 includes a program controller 24, (the details of which will be described later in connection with FIG. 5), which responds in accordance with the program control portion of an addressed or selected one of the stored digital words and generates, at the end of each current clock period, (c.p.), the memory location or address of the stored digital word to be selected during the succeeding clock period. Each clock period is defined by the terminal portion of a clock pulse (CLCK). Such clock pulses are supplied by a suitable clock means, not shown. Included in the programmable arithmetic controller 12 is a macrocontroller 26. Macrocontroller 26 responds in accordance with the macroinstruction portion of the selected digital word and includes a macrogenerator 28, the details of which will be discussed later in connection with FIG. 3. Suffice it to say here that such macrogenerator 28 produces a macroinstruction in accordance with the macroinstruction control field portion of the selected digital word. The macroinstruction of the selected digital word is decoded by a "level 1" decoder, here decoder 30. Such decoder 30 here is a read only memory. Such decoder, in response to each macroinstruction applied thereto, develops a control signal on a bus 32. During each clock period (c.p.) the macroinstruction produced by macrocontrol generator 28 also is passed through serially coupled registers 34, 36, 38, respectively, as shown. The macroinstruction stored in register 36 is decoded by a "level 2" decoder, here also a read only memory, as decoder 40. Such decoder 40, also in response to each macroinstruction applied thereto, develops a control signal on bus 42. Likewise, the macroinstruction stored in register 38 is decoded by "level 3" decoder, here also a read only memory, as decoder 44. Such decoder 44, in response to each macroinstruction applied thereto, also develops a control signal on bus 46. It is here noted, in passing, that macrocontroller 26 may be considered as including a plurality of (here three) serially coupled control levels, each one thereof being adapted to produce an independent control signal on buses 32, 42, 46. Further, each macroinstruction applied to decoder 30 is stored in each of the registers 34, 36, 38 sequentially during consecutive clock periods.

Pipeline Arithmetic Unit

Pipeline arithmetic unit 14 includes a plurality (here 3) of serially coupled data processing levels, the number of such levels corresponding to the number of control levels of the macrocontroller 26. In particular, processing level 1 of the pipeline arithmetic unit 14 includes a level 1 selector 48, registers 50, 52, 54, 56, 58 and a complex multiplier 60, all arranged as shown. Level 1 selector 48 is of conventional design to couple data on buses 62, 64, 68 selectively to output lines 70, 72 in accordance with the control signal on bus 32, such control signal being developed by the decoder 30, as mentioned. Data processing level 2 of the pipeline arithmetic unit 14 includes a level 2 selector 74, registers 76, 78, a complex adder 80 and complex subtractor 82. Level 2 selector 74 also is of conventional design and couples data on buses 84, 86, 88 to output buses 90, 92, 94, 96 selectively in accordance with the control signal on bus 42, such control signal being developed by the decoder 40 as mentioned above. It is here noted that, for reasons to be apparent, bus 84 is coupled to a suitable voltage supply, not shown, such supply representing a decimal 0. Processing level 3 of the pipeline arithmetic unit 14 includes a level 3 selector 98, also of conventional design, to couple the data on buses 100, 102 to output buses 104, 106, 107 in accordance withe the control signal on bus 46, such control signal being developed by level 3 decoder 44 as mentioned above.

Figure 6A:
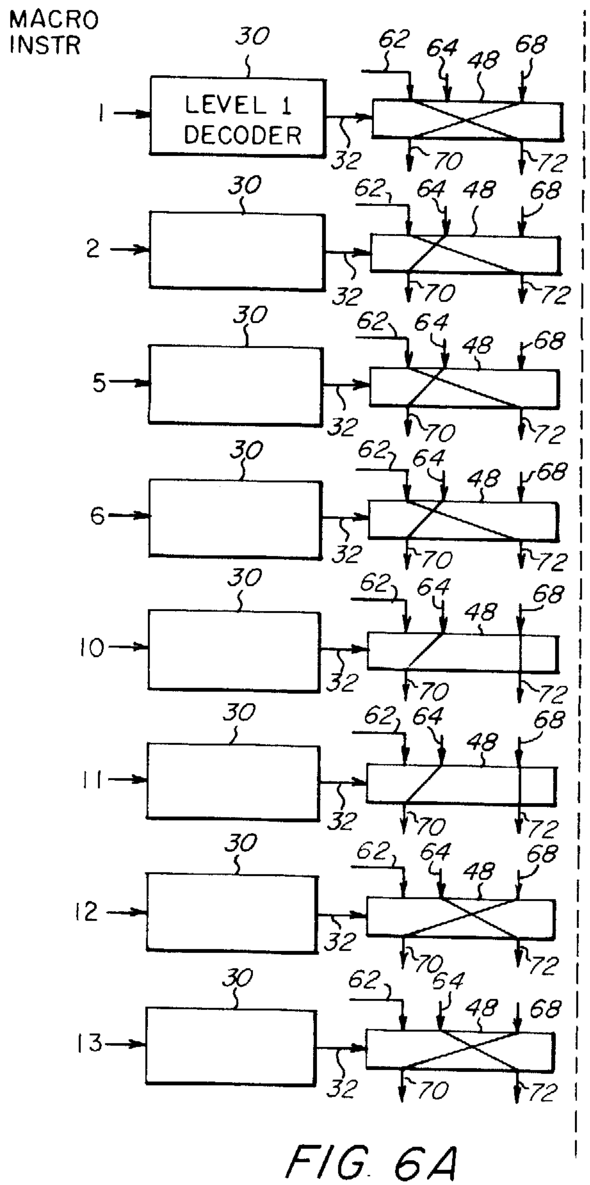
Figure 6B:
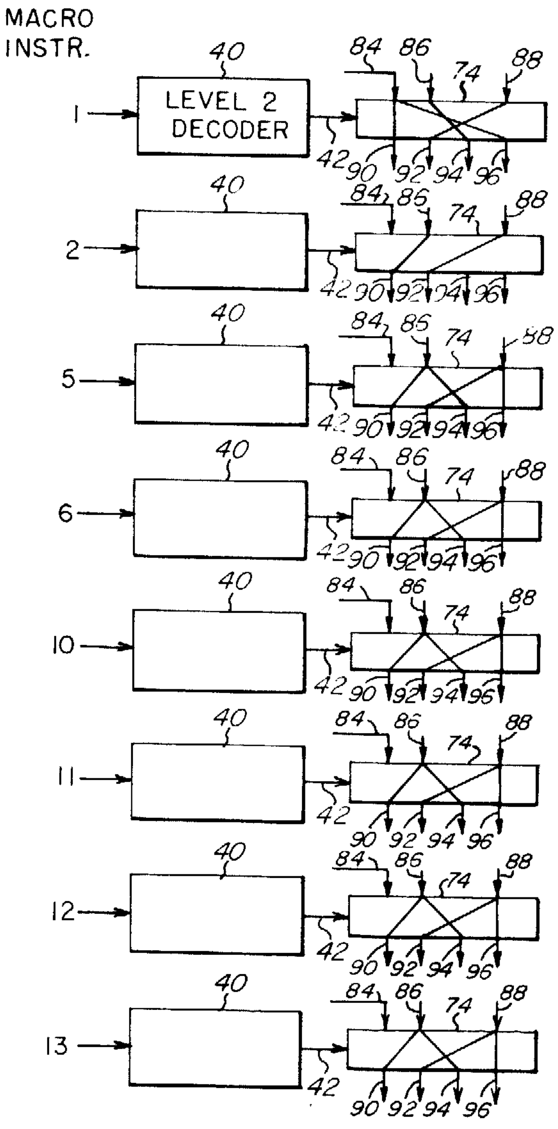
Figure 6C:
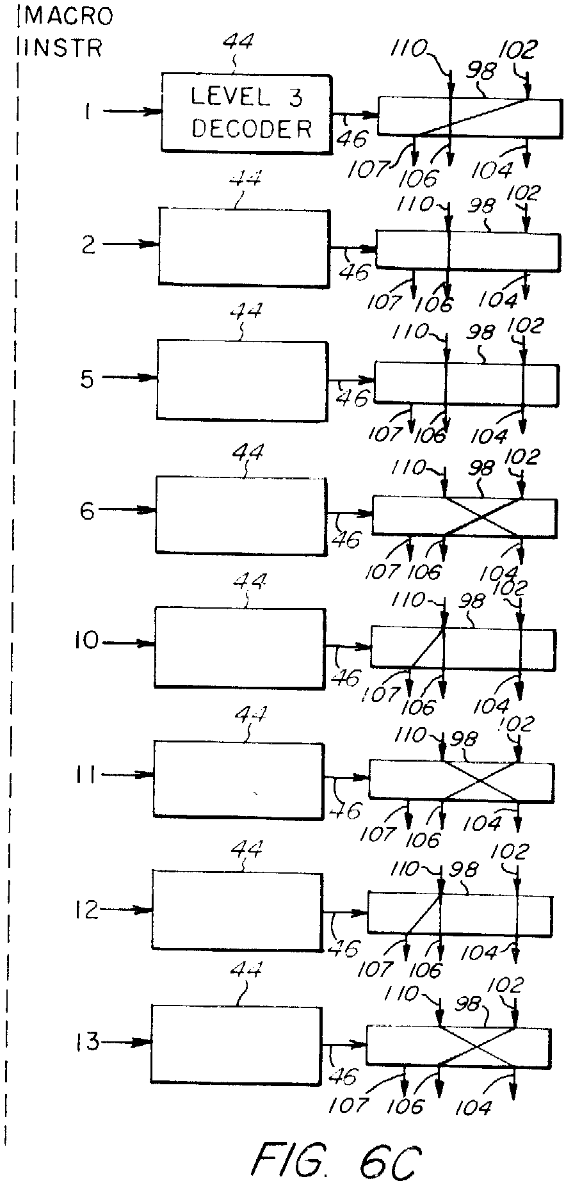

Referring now to FIG. 6A, the configuration of level 1 selector 48, in response to a macroinstruction applied to level 1 decoder 30, is shown for the following such macroinstructions Nos. 1, 2, 5, 6, 10, 11, 12 and 13 to perform both MTI processing and a 32 point Fast Fourier Transform. FIGS. 6B and 6C show the configurations of level 2 and level 3 selectors respectively in response to the macroinstructions applied to level 2 decoder 40 and level 3 decoder 44, respectively, for macroinstructions Nos. 1, 2, 5, 6, 10, 11, 12 and 13. It is here noted that to perform other types of processing the macroinstructions may be changed with a concomitant change in the level selectors.

The relationship between macrocontroller 26 and the pipeline arithmetic unit 14 is such that each data processing level of the pipeline arithmetic unit is configured in accordance with the control signal provided by the corresponding control level of the macrocontroller 26. In particular, data, here, for example, complex digital words representative of the quadrature components of the video signal of a radar system, (not shown) are applied to the input of level 1 selector 48 during each clock period and are processed in processing level 1 in accordance with the configuration of such processing level as defined by the macroinstruction field of the selected digital word. The time delay provided by the various logic elements in each such processing level, together with the time delay provided by the registers therein, are balanced by the time delays provided by registers 34, 36 of the macrocontroller 26. Therefore, when a first set of data processed by processing level 1 is applied to level 2 selector 74 (i.e., two clock periods later) the macroinstruction associated with such first set of data is decoded by the level 2 decoder 40 and applied to the level 2 selector 74. Concurrently, as a second succeeding set of data is applied to the level 1 selector 48, the selected digital word associated with such second set of data has its macroinstruction control field decoded by the decoder 30. Continuing in like manner, when the first set of data is applied to the level 3 selector 74 (i.e., three clock periods after entering level 1) the macroinstruction associated therewith is decoded by the decoder 44 and applied to such level 3 selector and when the second set of data is applied to the level 2 selector the macroinstruction associated therewith is decoded by the decoder 40 and applied to such level 2 selector. Also, as the next succeeding set of data (i.e., the third set of data) is applied to the level 1 selector 48, the selected digital word associated therewith has its macroinstruction control field decoded by the decoder 30. Consequently, each macroinstruction may be viewed as passing through the control levels of the macrocontroller 26 in synchronism with the associated data as that data passes through each data processing level of the pipeline arithmetic unit 14. Therefore, the elements in each one of the data processing levels are interconnected, independently of each other, but in accordance with the macroinstruction associated with each data processing level as the process is being carried out.

Address Generator Unit

Completing FIG. 1, address generator unit 16 is shown to include a data memory "A" address generator 108, a data memory "B" address generator 110 and a coefficient memory address generator 112. Data memory address generators "A" and "B" are identical in construction and an exemplary one thereof, say data memory "A" address generator 108, is shown in detail in FIG. 2. Such exemplary data memory "A" address generator 108 responds to the data memory "A" address field portion of the selected digital word in the control memory means 10. Such address field portion includes a location (i.e., LOC.) portion and an initial/increment (i.e., INIT/INCR.) portion. The exemplary data memory "A" address generator 108 includes: a selector 114, one input thereof being coupled to a suitable voltage supply (not shown) to represent a decimal 0 and another input thereof being coupled to the output of a register 116. Register 116 stores the address, R, of the location of data memory "A" from which data is to be read. Selector 114 is controlled by the INIT/INCR. portion of the selected digital word and couples selectively either the decimal decimal 0 or the contents of register 116 to the output of such selector 114 in accordance with the INIT/INCR. portion of such selected word. In particular, if such INIT/INCR. portion of the selected digital word is an "INIT" signal, the decimal zero is coupled to the output of selector 114 and the address stored in register 116 does not change at the end of the current clock period. If such INIT/INCR. portion of the selected digital word is "INCR.," register 116 will ultimately have stored therein at the end of the current clock period the address previously stored therein, incremented by an amount indicated in the LOC portion of the selected digital word. In particular, in response to the INCR. signal, selector 114 couples the contents of register 116 to its output. The data in the LOC portion of the selected digital word is then combined with the output of selector 114 in an adder 118. For reasons to become apparent later, the addressing of the data "A" memory 18 by the register 116 is in a read (R)-write (W) sequence. The time interval between the read addressing and write addressing in the sequence is equal to the time delay within the pipeline arithmetic unit 14 (FIG. 1). With the particular three level pipeline arithmetic unit 14 shown in FIG. 1, a three clock period delay is provided by a delay line 120, of conventional design, here a three stage shift register.

Coefficient memory address generator 112 (FIG. 1) is identical to the exemplary data memory address generator shown in FIG. 2 except that such coefficient memory address generator 112 does not produce a write address signal W. That is, coefficient memory address generator 112 contains a selector, an adder and a register but no delay line.

Data memories "A" and "B" are coupled respectively to the data memory address generators "A" and "B" as shown in FIG. 1. Such data memories "A" and "B" are random access memories which are here adapted to have data written therein concurrently as data stored therein is read therefrom. One such memory is described in U.S. Pat. No. 3,761,898 issued Sept. 25, 1973, entitled "Random Access Memory," Henry C. Pao, Inventor, and assigned to the same assignee as the present patent application. Data read from data memories "A" and "B" appear on buses 64 and 68 respectively as shown in FIG. 1. Data written into data memories "A" and "B" are applied on buses 106 and 104 respectively as shown. The address of the location wherein data is to be written appears on bus W and the location wherefrom data is to be read is on bus R, as mentioned above. Coefficient memory 112 is here a conventional random access memory. Data read from such coefficient memory appears on bus 126 as shown in FIG. 1. The address of the location in such memory wherefrom data is to be read is on bus R as mentioned above.

Program Controller

Figure 5:
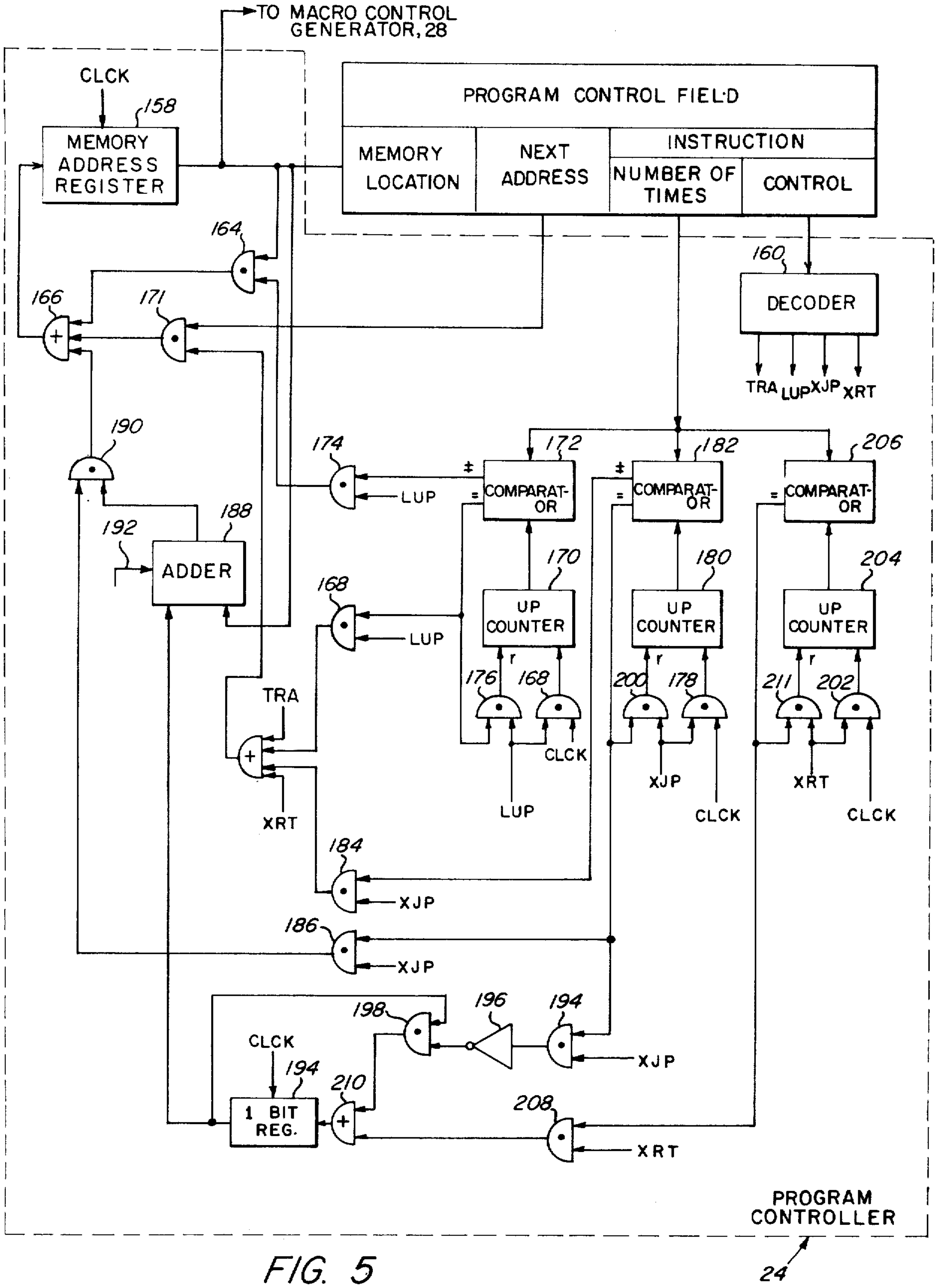
FIG. 5 is a block diagram of the program controller used in the signal processor of FIG. 1.

Referring now to FIG. 5, the details of program controller 24 are shown to be adapted to perform FFT and MTI signal processing functions. Program controller 24 responds in accordance with the program control field portion of the selected digital word and obtains the address for the digital word which is to be selected during the next clock period. Such control field includes a "next address" portion and an "instruction" portion here made up of a "number of times" instruction and a "control" instruction. The control instruction may take one of four different forms. Such forms may be summarized as follows:

TRA = transfer during the next clock period to the digital word indicated by the next address field of the digital word selected during the current clock period.

LUP = remain at the present address for the number of clock periods indicated by the number of times instruction portion of the selected digital word (including counting the current clock period as 1) and then address the address indicated by the next address field.

XRT = address the digital word at the address indicated by the next address portion of the selected digital word. When the selected digital word having the XRT instruction is selected for the number of times indicated by the number of times portion of such selected digital word, the XRT control instruction then provides an indicator control signal for use by the XJP control instruction described below.

XJP = address the digital word at the address indicated by the next address portion of the selected digital word. After the selected word is selected for the number of times indicated by the number of times portion of such selected digital word, transfer to either: the next successive address (i.e., the present address plus 1); or, the second next successive address (the present address plus 2) when the indicator control signal has been provided by the XRT instruction.

Referring now to the details of the program controller 24, a memory address register 158 is provided to select (i.e., address) one of the digital words stored in the control memory means 10. The address of the selected digital word is stored in memory address register 158. A decoder 160 is provided to decode the control instruction portion of the selected digital word. When the level of the signal on a TRA line is raised, an enabling signal from OR gate 162 allows the next address portion of the selected digital word to pass through AND gate 170 and OR gate 166 to memory address register 158. Such next address portion is stored in memory address register 158 at the end of the current clock period, thereby providing the address for the digital word to be selected during the next clock period.

When the level of the signal on the LUP line is raised, clock pulses can pass through AND gates 168 to upcounter 170. The contents of upcounter 170 are compared with the number of times instruction portion of the selected digital word by means of comparator 172. When the comparator 172 indicates that the number of clock pulses during thee time interval since the initial selection of said digital word is less than the number of times portion of such selected digital word an enabling signal from AND gate 174 allows the address stored in memory address register 158 to pass through AND gate 164, OR gate 166 and be applied to the input of said memory address register. When the comparator 172 indicates that the number of clock pulses during the time interval since the initial selection of the digital word is equal to the number of times instruction portion of such selected digital word an enabling signal passes from AND gate 168 through OR gate 162 and enables the next address portion of such selected digital word to pass through AND gate 171 and OR gate 166 to memory address register 158 where it is stored in the next clock pulse. Further, a reset signal "*r*" is produced by AND gate 176, such reset signal resetting upcounter 170 to 0.

When the level of the signal on XJP line is raised, clock pulses pass through AND gate 178 to upcounter 180. Comparator 182 compares the number of clock pulses applied to upcounter 180 with the number of times instruction portion of the selected digital word. When comparator 182 indicates that the number of clock pulses passing to upcounter 180 is less than the number of times portion of the selected digital word an enabling signal from AND gate 184 passes through OR gate 162 and allows the next address portion of the selected digital word to pass through AND gate 170, OR gate 166 to memory address register 158. Generally the next address portion of a word having the XJP instruction is the same as the memory location of such word. When comparator 182 indicates that the number of clock pulses passing to upcounter 180 is equal to the number of times portion of the selected digital word an enabling signal from AND gate 186 allows the output of adder 188 to pass through AND gate 190 and OR gate 166 to the memory address register 158. The output of adder 188 is the sum of: The address contained in the memory address register 158; the signal on line 192; and the contents of a 1 bit register 194. The signal on line 192 is coupled to a voltage supply, not shown, representative of a decimal one. A "high" signal produced at the output of AND gate 194 (when comparator 182 detects equality of its inputs) is converted to a "low" signal by means of inverter 196, which thereby inhibits one signal (if stored in register 194) from passing through AND gate 198. This causes a 0 then to be stored in one bit register 194. It follows then that when the comparator 182 indicates that the number of times portion of the selected digital word equals the number of clock pulses passing through AND gate 178 to upcounter 180, the memory address register 158 will have applied thereto the next successive address, (i.e., the present stored address plus 1). However, if register 194 has been previously set to decimal one when comparator 182 detects equality of its inputs the memory address register 158 will have applied thereto the second next successive address (i.e., the present address plus 2). Further, when the comparator 182 indicates that the number of clock pulses passing to upcounter 180 is equal to the number of times portion of the selected digital word, a reset signal *r* is developed by AND gate 200 to reset upcounter 180 to 0.

When the level of the signal on the XRT line is raised, indicating execution of an XRT instruction type, clock pulses are allowed to pass through AND gate 202 to upcounter 204. A comparator 206 is provided to compare the number of clock pulses passing to upcounter 204 with the number of times portion of the selected digital word. As long as the comparator 206 indicates that the number of clock pulses passing to upcounter 204 is less than the number of times portion of the selected digital word, the raised signal on the XRT line passes through OR gate 162 to allow the next address portion of the selected digital word to pass through AND gate 170 and OR gate 166 to memory address register 158. When the comparator 206 indicates that the number of clock pulses passing to upcounter 204 is equal to the number of times portion of the selected digital word, an enabling signal produced by AND gate 208 passes through OR gate 210. Consequently, register 194 has stored therein a one starting with the next clock period. As mentioned above, when a succeeding selected word contains an XJP restriction the next address becomes incremented by 2. Further, when comparator 206 indicates that the number of clock pulses passing to upcounter 204 is equal to the number of times portion of the selected digital word, a reset signal *r* is developed by AND gate 211, thereby resetting upcounter 204 to 0 and register 194 to 0.

Macrocontrol Generator

Referring now in detail to FIG. 3, macrocontrol generator 28 responds in accordance with: The address stored in memory address register 158 of program controller 24; and, the macroinstruction field portion of the selected digital word, as indicated. The program controller 24 supplies the address for the selected digital word in the control memory means 10 as mentioned above. The macroinstruction field includes a macroinstruction number, (i.e., "(#)" portion) and a "'p' control" portion. For each of the repertoire of signal processing functions there is a set of instructions stored in the control memory means 10 in the form of a set of digital words. Each digital word has associated with it a macroinstruction number. The macroinstruction number associated therewith is produced by the macrocontrol generator 28 and ultimately is stored in register 128. The macroinstruction number at the output of the macrocontrol generator 28 is decoded by decoder 30 and passes successively through resisters 34, 36, 38 sequentially during clock periods as described previously in connection with FIG. 1. As mentioned, the macroinstruction number, as it passes through the macrocontroller 26, interconnects the elements of a processing level of the pipeline arithmetic unit 14 in accordance with the macroinstruction number (FIG. 6A–6C).

For many signal processing functions, as in FFT processing, it is desirable that the macroinstruction number associated with each selected digital word by processed prior to being passed to the output of the macrocontrol generator 28. The full significance of such processing will become apparent hereinafter; however, suffice it to say here that for the particular embodiment herein described, the macroinstruction number associated with each selected digital word may be processed in one of three different ways prior to being passed to the output of macrocontrol generator 24, (i.e., stored in register 128): (1) The macroinstruction number of the selected digital word is transferred directly to register 128 (when a "one" is contained in the "*p*" control portion of the selected digital word); (2) The macroinstruction number associated with the selected digital word remains the same as the macroinstruction number associated with the previously selected digital word (when a "two" is contained in the *p* control portion of the selected digital word); or (3) The macroinstruction number associated with the selected digital word is modified, in accordance with a "change sequence" program stored in a macromemory 130, during the next clock period (when a "three" is contained in the *p* control portion of the selected digital word). When the *p* control field contains a one, decoder 132 raises the level of the signal on line $P_1$ (the levels of the signals on lines $P_2$ to $P_3$ remaining low). The macroinstruction number of the selected digital word therefore passes through AND gate 134 (in response to the raised signal level on line $P_1$) and OR gate 136 to be stored in register 128 in response to the next clock pulse. When the *p* control field contains a two, decoder 132 raises the signal level on line $P_2$ (the signal level on lines $P_1$, $P_3$ remaining low). The raised signal level on line $P_2$ causes an enabling signal to pass through OR gate 138 to AND gate 140. The contents of register 128 pass through such AND gate 140 and OR gate 136 to again be stored in such register at the next clock pulse. When *p* control field is a three, decoder 132 raises the level of the signal on line $p_3$ (the levels of the signals on lines $p_1$ and $p_2$ remaining low). The address portion of the memory address register 158 of the program controller 34 is compared with the contents of register 146 by means of a comparator 148. The contents of register 146 are the address of the previously selected digital word. Therefore, if the address of the presently selected word differs from the address of the previously selected word, comparator 148 raises the level of the signal on line 150. The "raised" signal level on line $p_3$ thereby provides an enabling signal at the output of AND gate 152 which thereby allows the contents of macromemory 130 (here a conventional random access memory) to pass through AND gate 144, OR gate 136 and become stored in register 128. The program stored in macromemory 130 is shown in FIG. 4, the address for such memory being provided by the contents of register 128. If, during the next succeeding clock period, the address of the presently selected digital word does not change from the address of the previously selected digital word, comparator 148 raises the level of the signal on line 154. An enabling signal will thereby by developed at the output of AND gate 156. Such signal passes through OR gate 138 to allow the contents of register 128 to pass through AND gate 140 and OR gate 136, again to be stored in register 128 at the next clock pulse.

EXAMPLE 1

In order to understand the operation of the signal processor a 32 point FFT is selected as a first signal processing function example. Referring to FIG. 7, a flow diagram for such 32 point FFT is shown. The algorithm representative of the flow diagram is described in an article entitled "An Economical Method for Calculating the Discrete Fourier Transform" by R. Yavne published in 1968, Fall Joint Computer Conference AFIPS, Part 1, Vol. 33, Page 115.

The set of digital words or instructions necessary to perform the 32 point FFT signal processing function is listed in FIG. 8. Such set of digital words is stored in the control memory means 10 (FIG. 1) at the memory location (MEM. LOC.) or addresses indicated by any conventional means.

The instructions at MEM. LOCS. 1 and 2 are used in a preliminary processing phase for the FFT process and the execution of such instructions results in the first 16 samples $S_1 - S_{16}$ becoming stored in data memory "A" at locations 1–16 thereof, respectively. It is observed that with reference to FIG. 7 the FFT algorithm may be viewed (after the preliminary processing phase is completed) as being comprised of five different processes, (i.e., processes 1–5). The digital words in MEM. LOCS. 3, 4, 5 comprise the instructions associated with process 1. The digital words in MEM. LOCS. 6 to 9 comprise the instructions associated with process 2. The digital words in MEM. LOCS. 10–13 comprise the instructions necessary for the execution of process 3, the digital words in MEM. LOCS. 14 through 16 comprise the instructions associated with process 4 and the digital words in MEM. LOCS. 17 – 19 comprise the instructions associated with process 5. The digital words at MEM. LOCS. 20, 21 are used to execute a final data unload phase. Further, FIGS. 9 through 16 show the condition, where relevant to the process, of the various elements of the pipeline arithmetic unit 14 and macrocontroller 26 during each clock period.

In the preliminary processing phase the signal processor 9 (FIG. 1) will store in data memory "A", 18 of the first 16 digital samples ($S_1$–$S_{16}$), each one of such digital samples being successively derived at each successive clock pulse (CLCK). Such processing may be clearly understood with additional reference to FIG. 9. FIG. 9 shows during each clock period (c.p.): The memory location (MEM. LOC.) to be addressed during the next clock period (c.p.) (i.e., the data at the output of memory address register 158 (FIG. 5) ); the macroinstruction number associated with the digital word selected during the present c.p. (i.e., the data applied to register 128) (FIG. 3) ); the macroinstruction number applied to each one of the level decoders, 30, 40, 44 (FIG. 1); the data applied to each one of the level selectors 48, 74, 98 (FIG. 1); the read and write addresses for data memory "A" and data memory "B;" the read address for the coefficient memory; the data written into data memories "A" and "B" (i.e., buses 106, 104 (FIG. 1) and the data at the output of the processor (i.e., bus 107 (FIG. 1)).

As an initializing step all registers except memory address register 158 are set to 0 by any convenient means (not shown). Memory address register 158 is here initialized to 1 by any convenient means (not shown).

Referring in detail to FIG. 8, the digital word at MEM. LOC. 1 states that: The data memory "A" address is to be initialized to location 1; the coefficient memory address is to be initialized to location 1; the macroinstruction number 1 is to be selected; and, during the next clock period the digital word at MEM. LOC. 2 is to be selected. The digital word in MEM. LOC. 2 states that: Such digital word is to be selected for 15 consecutive clock periods including the current clock period; during such 15 clock periods the macroinstruction number is to remain unchanged at 1; the address of data memory "A" is to be incremented by 1 at the end of each C.p.; and the address of the coefficient memory is to remain unchanged at 1. After such 15 consecutive clock periods the digital word at MEM. LOC. 3 is to be selected, thus completing the initial processing phase.

The execution of the digital words at MEM. LOCS. 1 and 2 is illustrated in FIGS. 9 and 10. During an initializing clock period the memory address register 158 (having been initialized to 1) selects the digital word in MEM. LOC. 1. Therefore, macroinstruction number 1 is applied to register 128 and a 2 (i.e., from the next address portion of the word at MEM. LOC. 1) is applied to register 158.

During the second c.p. the macroinstruction number 1 appears at the output of macrocontrol generator 28 (i.e., applied to level 1 decoder 30) and is applied to the input of register 34 (FIG. 1). Referring to FIG. 6A, it is evident that during the second c.p. the first sample $S_1$ is applied to register 52 and the contents of the coefficient memory at location 1, which is 1, is applied to register 54. Meanwhile, during the second c.p. a 2 is stored in memory address register 158, thereby again selecting the digital word in MEM. LOC. 2 and macroinstruction number 1 is again applied to register 128.

During the third clock period sample $S_1$ becomes stored in register 52; macroinstruction number 1 follows sample $S_1$ and becomes stored in register 34; a macroinstruction number 1 is applied to register 128 and to level 1 decoder 30; and sample $S_2$ is applied to bus 62.

During the fourth clock period the macroinstruction number 1 becomes stored in register 36 and applied to the level 2 decoder 40; sample $S_1$ becomes stored in register 58 and is applied to bus 88; sample $S_2$ becomes stored in register 52; macroinstruction 1 becomes stored in register 34; a macroinstruction number 1 is applied to register 128; and sample $S_3$ is applied to bus 62.

During the fifth clock period sample $S_1$ passes through complex adder 80 and becomes stored in register 76 (FIG. 6B). The macroinstruction number 1 associated with sample $S_1$ becomes stored in register 38 and is applied to level 3 decoder 44. Therefore, sample $S_1$ becomes coupled to data memory "A" via bus 106 (FIG. 6C). It is also here noted that, during the second clock period, (because of the one clock period delay caused by register 116 (FIG. 1) ) the data memory "A" read address (R) was initialized to location 1. Because delay 120 caused an additional 3 c.p. delay in addressing such data memory "A" for writing data into location 1, sample $S_1$ becomes stored in location 1 of data memory "A" during the fifth clock period. Succeeding samples $S_2$ – $S_{16}$ pass through the pipeline arithmetic unit 14 in like manner as indicated in FIGS. 9 and 10 to be stored in successive locations in data memory "A".

During the seventeenth clock period (FIG. 10) the memory address register 158 has stored therein a 3, thereby selecting the digital word stored in MEM. LOC. 3 of the control memory means 10. This starts process 1 of the algorithm. It is noted, however, that the preliminary processing phase has not yet been completed (such phase being completed during the 20th clock period). The digital word at MEM. LOC. 3 (FIG. 8) states that such digital word is to be selected for one clock period and then the digital word at MEM. LOC. 4 is to be selected; the macroinstruction number is initialized to 5; the read addresses of data memories "A" and "B" are to be initialized to location 1; and the read address of the coefficient memory is to be initialized to 1. Therefore, at the eighteenth clock period level 1 decoder 30 has applied thereto a macroinstruction number 5. Further, during the time of the 18 th c.p. the digital word at MEM. LOC. 4 is selected.

The digital word at MEM. LOC. 4 states that such digital word is to be selected for seven clock periods and then the digital word at MEM. LOC. 5 is to be selected; the macroinstruction number is to remain at 5 for each one of the seven clock periods; the read addresses of data memories "A" and "B" are to be incremented once during each one of the seven clock periods; and the read address of the coefficient memory is to remain at location 1. Therefore, at the 18th clock period the sample $S_{17}$ is coupled to register 52 and sample $S_1$ is read from data memory "A" and applied to register 50 (as indicated in FIG. 6A). During the 19th c.p. the sample $S_{17}$ is applied to register 58, sample $S_1$ is applied to register 56 and the macroinstruction number 5 follows such sample and is applied to register 36. During the 20th c.p. the quantity $S_1 + S_{17}$ is applied to register 76, the quantity $S_1 - S_{17}$ is applied to register 78, and the macroinstruction number 5 is applied to register 38. It is noted that during this 20th c.p. sample $S_{16}$ passes through level selector 3, in accordance with the macroinstruction number 1, which is applied to level 3 decoder 44, and is stored in location 16 of data memory "A" thereby completing the preliminary processing phase while process 1 continues. During the 21st c.p. level 3 decoder 44 responds to macroinstruction number 5, the quantity $S_1 + S_{17}$ is applied to data memory "A" and the quantity $S_1 - S_{17}$ is applied to data memory "B".

During the 25th c.p. memory address register 158 selects the digital word at MEM. LOC. 5. The digital word at MEM. LOC. 5 states that: The digital word at MEM. LOC. 5 will be selected for 8 c.p.'s and then the digital word at MEM. LOC. 6 will be selected; the macroinstruction number is to be incremented to 6; the data memory "A" read address (R) is to be incremented once each c.p.; the data memory "B" read address (R) is to be incremented once each c.p.; and the coefficient read address (R) is to remain at location 1. It is here noted that during the 26th c.p. samples $S_9$ and $S_{25}$ are associated with macroinstruction No. 6 concurrently as samples $S_8$ and $S_{24}$, $S_7$ and $S_{23}$, $S_6$ and $S_{22}$ are associated with macroinstruction No. 5.

The digital word at MEM. LOC. 6 starts process 2 (FIG. 11) and states that such digital word is to be selected for one clock period and then the digital word at MEM. LOC. 7 is to be selected; the macroinstruction number is to be initialized to 10; the data memory "A" read address is to be initialized to location 1; the data memory "B" read address is to be initialized to location 9 and the coefficient memory read address is to be initialized to location 2. Location 2 of coefficient memory 22 has stored therein $K_2 = \omega^\circ$ where $\omega^\circ = 1$. Therefore, during the 34th clock period the data stored in location 1 of data memory "A" (here designated "$A_1^1$") and the data stored in location 9 of data memory "B" (i.e., "$B_9^1$") and the data in location 2 of the coefficient memory (i.e., $K_2$) are applied to register 50, 52 and 54, respectively, as indicated in FIG. 11. It is here noted that in FIGS. 11–15 the following notation is used: $A_N^M$ = data in data memory "A" location N at the end of process M.

$B_N^M$ = data in data memory "B" location N at the end of process M.

The digital word at MEM. LOC. 7 states that: the digital word at MEM. LOC. 7 is to be selected for three clock period and after such three clock periods the digital word at MEM. LOC. 8 is to be selected; macroinstruction number is to remain at 10 for each one of such three clock periods; the read addresses of data memory "A" and data memory "B" are to be incremented by 1 during each one of the three clock periods; and the coefficient memory read address is to remain at location 2 for each of such three clock periods.

The digital word at memory location 8 states that: Such word is to be selected for four clock periods and then the digital word at MEM. LOC. 9 is to be selected; the macroinstruction number is sequenced in accordance with the program stored in the macromemory 130 (FIG. 3) and therefore here is changed to number 11 for each one of the four clock periods; the data memory "A" and data memory "B" read addresses are to be incremented by 1 for each one of the four clock periods; and, the coefficient memory read address R is to remain at location 2.

The digital word at MEM. LOC. 9 states that: The digital word at MEM. LOC. 7 is to be selected at the next clock period; the macroinstruction number is to sequence to 12; data memory "A" read address (R) is to increment by 1 and the data memory "B" read address is to increment by −15; and coefficient memory read address is to increment by 1 to location 3. The coefficient memory 22 has stored in location 3, $K_3 = j\omega^\circ$ where $j = \sqrt{-1}$. It is here noted that the number of times portion of the digital word at MEM. LOC 9 is a 1 and the control instruction portion of such word contains an "XRT" instruction. That is, the digital word at MEM. LOC. 9 has been selected once, (i.e., the number of times indicated in the number of times portion of such digital word). Referring to FIG. 5, it is noted that comparator 206 raises the level of the signal applied to AND gate 208 (i.e., the number of CLCK's are equal to the number of times portion of the digital word at MEM. LOC. 9). Because the signal on the XRT line is also raised, a "1" becomes stored in the 1 bit register 194.

Digital word at MEM. LOC. 7 is selected for three clock periods and the macroinstruction number associated with such digital word remains at 12 for each one of the three clock periods. After such three clock periods the digital word at MEM. LOC. 8 is selected for four clock periods during which time the macroinstruction number is sequenced to number 13. It is noted that the digital word at MEM. LOC. 8 contains the XJP control instruction. Therefore, referring to FIG. 5, the level of the signal on the XJP line is raised, and the contents in adder 188 pass through AND gate 190 to the memory address register 158. As mentioned above, the digital word at MEM. LOC. 9 has been selected for the number of times indicated by the number of times portion of such digital word, (i.e., once), and resulted in a "1" being stored in 1 bit register 194. Therefore, the contents of adder 188 represent the sum of the address stored in the memory address register 158 plus 2. It follows then that after execution of the digital word at MEM. LOC. 8 (the digital word at memory location 9 having been executed once) the digital word at MEM. LOC. 10 is the next selected digital word.

The digital word at MEM. LOC. 10 starts process 3 (FIGS. 12 and 13) and states that: During the next clock period the digital word at memory location 11 is to be selected; the macroinstruction number is to be initialized to 10; the data memory "A" read address is to be initialized to location 1; the data memory "B" read address is to be initialized to location 13; and the coefficient memory read address is to be initialized to location 4. The coefficient memory has stored in location 4, $K_4 = \omega^\circ$.

The digital word at MEM. LOC. 11 states that: After one clock period the digital word at memory location 12 is to be selected; macroinstruction number is to remain at 10 during such clock period; data memory "A" and data memory "B" read addresses are to be incremented by 1 and the coefficient memory read address remains at the same location, here location 4.

The digital word at MEM. LOC. 12 states that: After two clock periods the digital word at MEM. LOC. 13 is to be selected; the macroinstruction number is to change to 11 for each one of the two clock periods; data memory "A" and data memory "B" are to have their read addresses incremented by 1 at each one of the two clock periods; and the coefficient memory read address is to remain at location 4.

The digital word at MEM. LOC. 13 states that: During the next clock period digital word at MEM. LOC.

11 is to be selected; the macroinstruction number is to be defined by the contents of macromemory 130 (FIG. 3) and therefore here becomes 12 for the present one clock period; data memory "A" read address is to increment by 1; data memory "B" read address is to increment by −7 and coefficient memory read address is to increment by 1 to location 5. The coefficient memory has stored in location 5, $K_5 = j\omega^\circ$.

The digital word at MEM. LOC. 11 states that: At the next clock period the digital word at MEM. LOC. 12 is to be selected; the macroinstruction number is to remain at 12; data memories "A" and "B" read addresses are to be incremented by 1; and the coefficient memory read address is to remain at location 5.

The digital word at MEM. LOC. 12 states that after two clock periods the digital word at MEM. LOC. 13 is to be selected; the macroinstruction number is to be changed to 13 for both clock periods; the data memory "A" and "B" read addresses are to increment by 1 at each of such two clock periods and the coefficient memory read address is to remain at location 5.

The digital word at MEM. LOC. 13 states that: At the next clock period the digital word at MEM. LOC. 11 is to be selected; macroinstruction number is to be selected in accordance with the macromemory 130 (FIG. 3) and therefore here becomes 10; the data memory "A" read address is to be incremented by 1; the data memory "B" read address is to be incremented by −7; and the coefficient memory read address is to be incremented by 1 to 6. The coefficient memory has stored in location 6, $K_6 = \omega^4$, where $\omega^4 = e(-j\,\pi/4)$. It is here noted that the digital word at MEM. Loc. 13 has now been selected twice.

The digital word at MEM. LOC. 11 states that: During the next clock period the digital word at MEM. LOC. 12 is to be selected; the macroinstruction number is to remain at 10; the data memories "A" and "B" are to have their read addresses incremented once; and the coefficient memory read address is to remain at location 6.

The digital word at MEM. LOC. 12 states that after two clock pulses the digital word at MEM. LOC. 13 is to be selected; the macroinstruction number is charged to 11 for each one of the two clock periods; the data memories "A" and "B" are to have their read addresses incremented once during each one of such two clock periods; and the coefficient memory read address is to remain at location 6.

The digital word at MEM. LOC. 13, now having been selected for a third time (i.e., the number of times indicated by the number of times instruction portion of such word), states that at the next clock period the digital word at MEM. LOC. 11 is selected; the macroinstruction number is to be defined by the macromemory 130, and here becomes 12; the data memory "A" read address is to be incremented once; the data memory B read address is to be incremented by −7; and a coefficient memory read address is to be incremented once to location 7. The coefficient memory has stored in location 7, $K_7 = -j\,\omega^4$.

The digital word at MEM. LOC. 11 states that: After one clock period the digital word at MEM. LOC. 12 is to be selected; the macroinstruction number is to remain at 12; data memories "A" and "B" are to have their read addresses incremented once; the coefficient memory read address location is to remain at location 7.

The digital word at memory location 12 states that: After two clock periods the digital word at MEM. LOC. 14 is to be selected (because the digital word at MEM. LOC. 13 has been selected for the number of times indicated by the number of times portion of such word); macroinstruction number is to be incremented by 1 to 13; data memories "A" and "B" are to have their read addresses incremented once at each one of the clock periods; and the coefficient memory read address is to remain at location 7. This completes process 3. Processes 4 and 5 continue in like fashion in accordance with the program as shown in connection with FIGS. 13, 14 and 15. The coefficient memory 22 has stored in locations 8–31, respectively, $K_8 - K_{31}$, where:

$K_8 - K_{31}$, where: $K_8 = \omega^\circ$
$K_9 = -j\omega^\circ$
$K_{10} = \omega^4$, where $\omega^4 = e\,(-\,J\ \pi/4)$
$K_{11} = j\omega^4$
$K_{12} = \omega^2$, where $\omega^2 = e\,(-\,J\ \pi/8)$
$K_{13} = -j\omega^2$
$K_{14} = \omega^6$ where $\omega^6 = e\,(-\,J3\ \pi/8)$
$K_{15} = -j\omega^6$
$K_{16} = \omega^\circ$
$K_{17} = -j\omega^\circ$
$K_{18} = \omega^4$
$K_{19} = -j\omega^4$
$K_{20} = \omega^2$
$K_{21} = -j\omega^2$
$K_{22} = \omega^6$
$K_{23} = -j\omega^6$
$K_{24} = \omega^1$ where $\omega^1 = e\,(-\,J\ \pi/16)$
$K_{25} = -j\omega^1$
$K_{26} = \omega^5$ where $\omega^5 = e\,(-\,J5\ \pi/16)$
$K_{27} = -j\omega^5$
$K_{28} = \omega^3$ where $\omega^3 = e\,(-\,J3\ \pi/16)$
$K_{29} = j\omega^3$
$K_{30} = \omega^7$ where $\omega^7 = e\,(-\,J7\ \pi/16)$
$K_{31} = -j\omega^7$ The final data unload phase (which starts during the 85th clock period and finishes during the 116th clock period) is shown in connection with FIGS. 15 and 16. It is here noted that, referring to FIG. 6C, data is produced at the output bus 107 of the processor 9 (FIG. 1) when level 3 decoder responds to macroinstruction number 1, 10 or 12. The output bus 107 is coupled to a utilization device (not shown in FIG. 1) which may be another signal processor or a buffer and display. Such utilization device is adapted to use only the data produced at the output bus 107 during the 85th through 116th clock period by means of a synchronizer (not shown).

EXAMPLE 2

Referring now to FIG. 17, a program flow diagram for an M.T.I. signal processing function is shown. As is known, the flow diagram, and hence the M.T.I. signal processing function, may be summarized as follows: For a first radar return a number (R) of sequentially taken complex digital samples $$\vec{D}_{i=1}^{k=1,2,3\ldots\text{"R"}},$$

each one thereof representing the in-phase and quadrature components of a video signal at correspondingly different ranges, are weighed by a complex weighing factor $\vec{B}_f=1$ (here assumed to be known a priori). Each sample is taken during a clock period. During the next radar return the samples associated therewith are weighted in a similar manner. The weighted samples associated with the first return are added to the samples associated with the second return at corresponding ranges. The process continues for a desired number of radar returns. In FIGS. 16 and 17 the subscript refers to the number of the radar return (or alternatively, the number of the transmitted radar pulse) and the superscript refers to the range gate (or alternatively, the clock period). As shown in detail, for the first radar return the digital sample taken at the first c.p. (i.e., $\vec{D}_1^1$) is weighted by the complex weighting factor associated with such first return (i.e., $\vec{B}_1$), thereby forming $$\vec{\Sigma}_1^1=\vec{D}_1^1\times\vec{B}_1.$$

As successive samples of such first radar return are taken, (i.e., $$\vec{D}_1^k$$

where $K = 2, 3, \ldots R$) each one thereof is also weighted by the complex weighting factor $B_1$, thereby forming $$\Sigma_1^k=D_1^k\times B_1.$$

for $K = 2, 3, \ldots R$. The set of quantities $$\{\vec{\Sigma}_1^k\}$$

where $K = 1, 2, \ldots R$, having been so formed are stored in the processor. After completion of this process the processor pauses for "Q" c.p.'s, where Q is the number of c.p.'s required to transmit a second radar pulse and to commence sampling the radar return resulting therefrom (i.e., $i = 1$) at the range of the first sample in the first return. The first sample associated with the second return $$\vec{D}_2^1$$

is weighted by a complex factor $B_2$, thereby forming $$\vec{D}_2^1\times\vec{B}_2$$

and such weighted sample is added to $$\vec{\Sigma}_1^1$$

(that is, the first weighted sample of the first radar return). This continues for all other K-1 samples associated with the second return, thereby forming:

$$\vec{\Sigma}_{i+1}^k=\vec{\Sigma}_i^k+\vec{D}_i^k\times\vec{B}i,$$

for $k = 1, 2, 3, \ldots R$. The quantities having been so formed are stored in the processor.

After another pause of Q c.p.'s, the samples associated with the third return $$\vec{D}_3^k;$$

$k = 1, 2, \ldots R$ are weighted by a complex factor $\vec{B}_3$ and combined with $$\vec{\Sigma}_{i+1}^k$$

in the manner described above to form $$\vec{\Sigma}_3^k.$$

This process continues for "N" radar pulses, where "N" is the number of radar returns being processed.

Referring now to FIG. 18, a program is shown for execution of the above described M.T.I. signal processing function. It is first noted that the digital words stored in MEM. LOCS. 22–27 of the control memory means 10 (FIG. 1), include either a macroinstruction number 1 or 2. The responses of level selectors 1–3 to such macroinstruction numbers 1 or 2 are shown in FIGS. 6*a* – 6*c*.

The digital word at MEM. LOC. 22 is selected in one of a number of different ways. For example, such word may be selected after completion of the FFT program described in Example 1 by including in the control instruction portion of the last digital word selected by the program in such example a "TRA" statement and by including in the next address portion "MEM. LOC. 22" statement.

The digital word at MEM. LOC. 22 states that: At the next c.p. the digital word at MEM. LOC. 23 is selected; the macroinstruction number is initialized to 0; the data memory "A" read address is initialized to be 0; and the coefficient memory read address is initialized to be 10.

The digital word at MEM. LOC. 24 states that: After "R" c.p.'s the digital word at MEM. LOC. 24 is selected; during each one of the "R" c.p.'s the macroinstruction number remains 1; data memory "A" read address is incremented once at each one of the "R" c.p.'s and the coefficient memory read address remains at location 100. From FIG. 6*a* – 6*c* it is evident that the effect of the statements in the digital words at MEM. LOC. 22 and 23 is that the R samples of the first radar return are: Weighted by the complex factor stand in location 100 of the coefficient memory; then routed to data memory "A;" and then stored in locations *O*to (R - 1) thereof respectively. It is noted that here (as with the FFT process, example 1) the macroinstruction number passes through each one of the control levels and "follows" the data associated therewith as such data pass through each one of the processing levels. Therefore, even after "R" c.p.'s, the data associated with the first radar return are in the arithmetic unit concurrently as the digital word at MEM. LOC. 24 is selected and processed.

The digital word at MEM. LOC. 24 states that: Such word remain selected for "Q" c.p.'s and then the digital word at MEM. LOC. 25 is to be selected.

The digital word at MEM. LOC. 25 states that: After 1 c.p. the digital word at MEM. LOC. 26 is selected; the macroinstruction number 2 is selected; the data memory "A" read address is initialized to location O; and the coefficient memory read address is incremented once to location 101. Considering FIGS. 6*a* – 6*c*, it is now evident that the effect of level selectors 1–3 responding in accordance with macroinstruction number 2 is that the first sample associated with the second radar return is weighted by the coefficient stored in location 101 of the coefficient memory and added with the previously weighted first sample associated with the first radar return, and the resulting sum is coupled to the data memory "A."

The digital word at MEM. LOC. 26 states that: Such digital word remains for "R – 1" c.p. and then the digital word at MEM. LOC. 27 is selected; the macroinstruction number remains at 2; the data memory "A" read address is incremented once for each one of the "R – 1" c.p.'s; and the coefficient memory read address remains at location 101 for each one of such c.p.'s. Therefore, as a result of execution of the digital word at MEM. LOC. 26, the remaining samples associated with the first and second radar return are processed in like manner, and in accordance with the program flow diagram in FIG. 17.

The digital word at MEM. LOC. 27 states that at the next c.p. the digital word at MEM. LOC. 24 is selected and the digital words at MEM. LOCS. 24, 25 and 26 continue as described above until the digital word at MEM. LOC. 27 has been selected a total of "N" times.

From the foregoing explanation of two different examples of pipeline processing it may be seen that the disclosed signal processor need not wait for the completion of one example before starting another example because a macroinstruction number associated with any particular data follows the data through the control levels as such data passes through the processing levels.

Having described a preferred embodiment of this invention, it is now evident that other embodiments incorporating its concepts may be used. For example, additional sets of digital words may be stored in the memory means for enabling execution of other signal processing functions, such as, but not limited to, monopulse alignment, calibration or constant false alarm rate averaging. Appropriate additional macroinstruction numbers would be required, with the level selectors, decoders and program controller being modified to respond to such added macroinstruction numbers. One example of monopulse alignment calibration suitable for execution by the signal processor according to this invention is described in copending patent application entitled "Monopulse Radar Receiver With Error Correction," Ser. No. 247,674, now U.S. Pat. No. 3,794,998 Inventors Earl C. Pearson, Jr., Gerrit B. Postema, Willard W. McLeod, Jr. and Frederick A. Fenzel, assigned to the same assignee as the present invention.

It is felt, therefore, that this invention should not be restricted to its disclosed embodiments but rather should be limited only by the spirit and scope of the appended claims.

What is claimed is:

1. A signal processor, comprising:

a. an arithmetic unit having a plurality of serially coupled levels of arithmetic processing circuitry; and, b. a controller having a corresponding plurality of serially coupled levels of control circuitry, each one of such levels of control circuitry being coupled to a corresponding one of the levels of arithmetic processing circuitry.

2. The signal processor recited in claim 1 including additionally:

a. means for receiving digital data and coupling such data to an input of the serially coupled levels of arithmetic processing circuitry;

b. means for storing a set of control instructions;

c. means for selecting one of the stored control instructions; and, d. means, operable synchronously with the receiving and coupling means, for coupling such selected control instruction to an input of the serially coupled levels of control circuitry.

3. The signal processor recited in claim 2 wherein each one of such levels of arithmetic processing circuitry includes a selector means and processing elements, such selector means being responsive to the control instruction applied thereto, to pass digital data applied to such level arithmetic processing circuitry through selected ones of the processing elements in accordance with such control instruction.

4. The signal processor recited in claim 3 wherein the controller includes means for enabling digital data to pass from one of the levels of arithmetic processing circuitry to a succeeding one of such levels synchronously as the control instruction applied to such one of the processing levels of control circuitry passes to the succeeding one of such levels of control circuitry.

5. The signal processor recited in claim 4 including, additionally: a data memory; and means for enabling digital data passing from one of the levels of arithmetic processing circuitry to be stored in such data memory, and for enabling digital data read from such data memory to be applied to the first one of the serially coupled levels of arithmetic processing circuitry.

6. In a signal processor wherein digital data applied to an input of an arithmetic unit at a predetermined clock rate passes through serially connected levels of arithmetic processing circuits in such an arithmetic unit, the improvement comprising:

a. means for storing a set of digital instructions;

b. means for selecting one of such instructions in such set at the predetermined clock rate;

c. a plurality of serially arranged levels of control circuits, each one thereof being coupled to a corresponding level of arithmetic processing circuitry in the arithmetic unit d. clock means for enabling the selected one of the digital instructions to pass through the serially arranged levels of control circuitry at the predetermined clock rate; and, e. decoder means for controlling each level of arithmetic processing circuitry in the arithmetic unit in accordance with such selected digital instruction.

7. A signal processor, comprising:

a. an arithmetic unit having a plurality of serially coupled levels of arithmetic processing circuitry, at least one of such levels including an arithmetic element, each one of such levels including a selector means, responsive to a control signal coupled thereto, for coupling selectively each one of a plurality of data buses connected to such selector to a plurality of output buses; and, b. a processor unit having a plurality of serially coupled control levels, each one of such levels of control circuitry being coupled to a different one of the plurality of selector means, each one of the levels of control circuitry including means for developing the control signal for the selector means coupled thereto.

8. The signal processor recited in claim 7 wherein one of such levels of arithmetic processing circuitry includes a complex multiplier coupled between one of the output buses of the selector means of such one of the levels of the arithmetic processing circuitry, and one of the plurality of input buses of the selector means of the succeeding level of the arithmetic processing circuitry.

9. The signal processor recited in claim 8 wherein said succeeding level of arithmetic processing circuitry includes a complex adder and a complex subtractor.

* * * * *